(12) United States Patent
Choi et al.

(10) Patent No.: US 9,606,665 B2
(45) Date of Patent: Mar. 28, 2017

(54) OBJECT MOVING METHOD AND ELECTRONIC DEVICE IMPLEMENTING THE SAME

(71) Applicant: Samsung Electronics Co., Ltd., Gyeonggi-do (KR)

(72) Inventors: Hyunsuk Choi, Daegu (KR); Minho Kim, Gyeongsangbuk-do (KR); Jiwoong Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 81 days.

(21) Appl. No.: 14/531,303

(22) Filed: Nov. 3, 2014

(65) Prior Publication Data

US 2015/0123921 A1    May 7, 2015

(30) Foreign Application Priority Data

Nov. 1, 2013    (KR) .......................... 10-2013-0132228

(51) Int. Cl.
*G06F 3/0488* (2013.01)
*G06F 3/041* (2006.01)
*G06F 3/0481* (2013.01)

(52) U.S. Cl.
CPC ........ *G06F 3/0416* (2013.01); *G06F 3/04817* (2013.01); *G06F 3/04886* (2013.01); *G06F 2203/04104* (2013.01)

(58) Field of Classification Search
CPC ........ G06F 3/0488; G06F 3/041; G06F 3/044; G06F 3/045
See application file for complete search history.

(56) References Cited

U.S. PATENT DOCUMENTS

| | | | |
|---|---|---|---|
| 6,323,846 B1 | 11/2001 | Westerman et al. | |
| 8,515,128 B1 * | 8/2013 | Hildreth | G06F 3/017 345/156 |
| 2002/0015024 A1 | 2/2002 | Westerman et al. | |
| 2005/0104867 A1 | 5/2005 | Westerman et al. | |
| 2006/0290921 A1 | 12/2006 | Hotelling et al. | |
| 2008/0005703 A1 * | 1/2008 | Radivojevic | G06F 1/1626 715/863 |
| 2012/0056837 A1 * | 3/2012 | Park | G06F 3/0414 345/173 |
| 2012/0182224 A1 * | 7/2012 | Waas | G06F 3/04883 345/173 |
| 2012/0254795 A1 | 10/2012 | Van Os et al. | |
| 2016/0041754 A1 * | 2/2016 | Rhee | G06F 3/04842 715/773 |

* cited by examiner

*Primary Examiner* — Ricardo L Osorio
(74) *Attorney, Agent, or Firm* — The Farrell Law Firm, P.C.

(57) ABSTRACT

A method of moving an object by an electronic device having a touch screen. The method includes recognizing at least two first touch inputs through the touch screen, recognizing transitions of the at least two first touch inputs to adjacent inputs that move adjacent to each other, and moving an object displayed on the touch screen in response to movements of the adjacent inputs.

15 Claims, 49 Drawing Sheets

540

OBJECT MOVING METHOD AND ELECTRONIC DEVICE IMPLEMENTING THE SAME

PRIORITY

This application claims priority under 35 U.S.C. §119(a) to Korean Patent Application filed on Nov. 1, 2013 in the Korean Intellectual Property Office and assigned Serial No. 10-2013-0132228, the entire content of which is incorporated herein by reference.

BACKGROUND

1. Field of the Invention

The present invention relates generally to a method of moving an object in response to a user input regarding a user input module and an electronic device implementing the same.

2. Description of the Related Art

An electronic device may have a touch panel installed on a touch screen as a user input module. The electronic device can sense the user's gesture regarding the touch screen and, in response to the gesture, move an object, which is displayed on the touch screen, from the originally displayed position to a different position.

SUMMARY

The present invention has been made to address above-mentioned problems and disadvantages, and to provide at least the advantages described below. Accordingly, an aspect of the present invention provides a method of intuitively selecting a movement target and moving it.

According to an aspect of the present invention, a method of moving an object by an electronic device having a touch screen is provided. The method includes recognizing at least two first touch inputs through the touch screen; recognizing transitions of the at least two first touch inputs to adjacent inputs that move adjacent to each other; and moving an object displayed on the touch screen in response to movements of the adjacent inputs.

According to another aspect of the present invention, an electronic device is provided. The electronic device includes a display module; a touch panel installed on a touch screen of the display module and configured to sense a user input; and a processor configured to control the display module in response to the user input, wherein the processor is configured to recognize at least two first touch inputs through the touch screen, recognize transitions of the at least two first touch inputs to adjacent inputs moving adjacent to each other, and move an object displayed on the touch screen in response to movements of the adjacent inputs.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

The following description with reference to the accompanying drawings is provided to assist in a comprehensive understanding of various embodiments of the present invention as defined by the claims and their equivalents. It includes details to assist in that understanding but these are to be regarded as mere examples. Accordingly, those of ordinary skill in the art will recognize that various changes and modifications of the various embodiments described herein can be made without departing from the scope and spirit of the present invention. In addition, descriptions of well-known functions and constructions may be omitted for clarity and conciseness.

An electronic apparatus according to the present invention may be an apparatus having a communication function. For example, the electronic device according to the present invention may be at least one of and/or combinations of a smart phone, a tablet Personal Computer (PC), a mobile phone, a video phone, an electronic-book (e-book) reader, a desktop PC, a laptop PC, a netbook computer, a Personal Digital Assistant (PDA), a Portable Multimedia Player (PMP), an Moving Picture Experts Group Audio Layer 3 (MP3) player, a mobile medical appliance, an electronic bracelet, an electronic necklace, an electronic accessory, a camera, a wearable device, an electronic clock, a wrist watch, home appliances, e.g. a refrigerator, an air conditioner, a cleaner, an oven, a microwave oven, a washing machine, an air cleaner, and the like, an artificial intelligence robot, a television, a Digital Video Disk (DVD) player, an audio player, various medical appliances, e.g. a Magnetic Resonance Angiography (MRA) device, a Magnetic Resonance Imaging (MRI) device, a Computerized Tomography (CT) device, an ultrasonography device and the like, a navigation device, a Global Positioning System (GPS) receiver, an Event Data Recorder (EDR), a Flight Data Recorder (FDR), a set-top box, a Television (TV) box, e.g. HomeSync™ of SAMSUNG Electronics, Co., Apple TV™ of APPLE, Inc., and Google TV™ of Google, Inc., an electronic dictionary, an infotainment device for a vehicle, an electronic equipment for a ship, e.g. a navigation device, a gyrocompass, etc., an avionic device, a security device, an electronic cloth, an electronic key, a camcorder, a game console, a Head-Mounted Display (HMD) unit, a flat panel display device, an electronic frame, an electronic album, a piece of furniture having a communication function and/or a part of a building/structure, an electronic board, an electronic signature receiving device, and a projector. It is obvious to those skilled in the art that the electronic device according to the present invention is not limited to the aforementioned devices.

Figure 1:
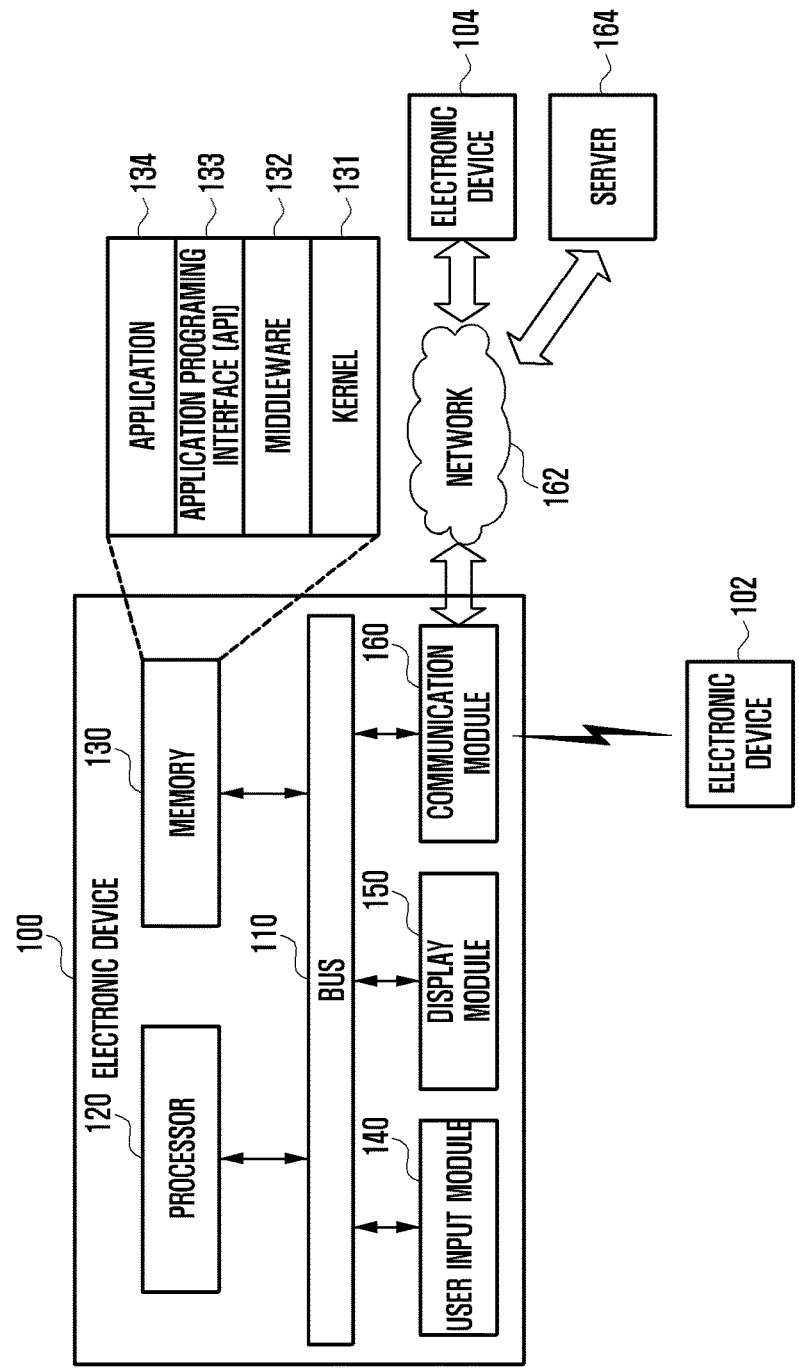
FIG. 1 is a block diagram of an electronic device according to an embodiment of the present invention.

FIG. 1 is a block diagram illustrating an electronic apparatus according to an embodiment of the present invention.

Referring to FIG. 1, the electronic apparatus 100 includes a bus 110, a processor 120, a memory 130, a user input module 140, a display module 150, and a communication module 160.

The bus 110 is a circuit for interconnecting elements described above and for allowing a communication, e.g. by transferring a control message, between the elements described above.

The processor 120 receives commands from the above-mentioned other elements, e.g., the memory 130, the user input module 140, the display module 150, and the communication module 160, through, for example, the bus 110, deciphers the received commands, and performs operations and/or data processing according to the deciphered commands.

The memory 130 stores commands received from the processor 120 and/or other elements, e.g., the user input module 140, the display module 150, and the communication module 160, and/or commands and/or data generated by the processor 120 and/or other elements. The memory 130 includes programming modules, such as a kernel 131, middleware 132, an Application Programming Interface (API) 133, and an application 134. Each of the programming modules described above may be configured by software, firmware, hardware, and/or combinations of two or more thereof.

The kernel 131 controls and/or manage system resources, e.g., the bus 110, the processor 120, or the memory 130, used for execution of operations and/or functions implemented in other programming modules, such as the middleware 132, the API 133, and/or the application 134. Further, the kernel 131 provides an interface through which the middleware 132, the API 133, and/or the application 134 can access and then control and/or manage an individual element of the electronic apparatus 100.

The middleware 132 performs a relay function which allows the API 133 and/or the application 134 to communicate with and exchange data with the kernel 131. Further, in relation to operation requests received from at least one of an application 134, the middleware 132 performs load balancing in relation to the operation requests by, for example, giving a priority in using a system resource, e.g., the bus 110, the processor 120, and/or the memory 130, of the electronic apparatus 100 to at least one application from among the at least one of the application 134.

The API 133 is an interface through which the application 134 can control a function provided by the kernel 131 and/or the middleware 132, and may include, for example, at least one interface or function for file control, window control, image processing, and/or character control.

The user input module 140 can receive, for example, a command and/or data from a user, and transfer the received command and/or data to the processor 120 and/or the memory 130 through the bus 110. The display module 150 can display an image, a video, and/or data to a user.

The communication module 160 can establish a communication between the electronic apparatus 100 and other electronic devices 102 and 104 and/or a server 164. The communication module 160 can support short range communication protocols, e.g., a Wireless Fidelity (WiFi) protocol, a BlueTooth (BT) protocol, and a Near Field Communication (NFC) protocol, communication networks, e.g., Internet, Local Area Network (LAN), Wide Area Network (WAN), a telecommunication network, a cellular network, and a satellite network, or a Plain Old Telephone Service (POTS), or any other similar and/or suitable communication networks, such as a network 162, or the like. Each of the other electronic devices 102 and 104 may be a same type and/or different types of electronic apparatus.

Figure 2:
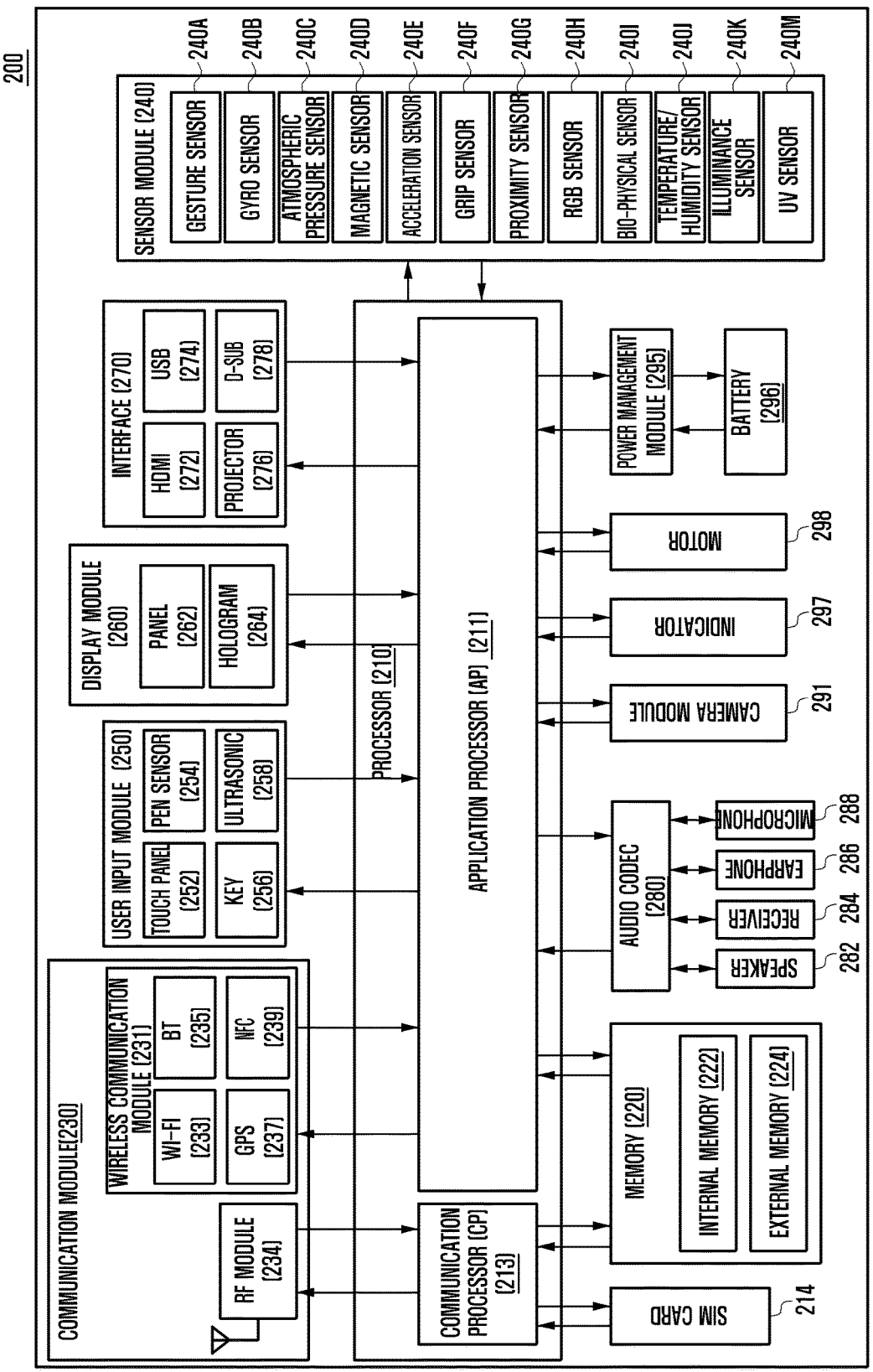
FIG. 2 is a block diagram of hardware according to an embodiment of the present invention.

FIG. 2 is a block diagram illustrating hardware according to an embodiment of the present invention.

A hardware 200 may be, for example, the electronic apparatus 100 illustrated in FIG. 1.

Referring to FIG. 2, the hardware 200 includes at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 includes at least one Application Processor (AP) 211 and/or at least one Communication Processor (CP) 213. The processor 210 may be, for example, similar to the processor 120 as illustrated in FIG. 1. Although FIG. 2 shows the AP 211 and the CP 213 included in the processor 210, the AP 211 and the CP 213 may be included in different Integrated Circuit (IC) packages, respectively. According to an embodiment of the present invention, the AP 211 and the CP 213 may be included in a single IC package.

The AP 211 executes an Operating System (OS) or an application program to control a plurality of hardware and/or software elements connected to the AP 211 and performs processing and calculations of various data including the multimedia data. The AP 211 may be implemented by, for example, a System on Chip (SoC). According to an embodiment of the present invention, the processor 210 may further include a Graphics Processing Unit (GPU) (not illustrated).

The CP 213 performs functions of managing a data link and/or converting a communication protocol in communication between an electronic apparatus, e.g. the electronic apparatus 100, including the hardware 200 and/or another electronic apparatus connected through a network to the electronic apparatus. The CP 213 may be implemented by, for example, an SoC. According to an embodiment of the present invention, the CP 213 performs at least a part of a multimedia control function. The CP 213 performs identification and authentication of a terminal in a communication network by using, for example, a user identification module, e.g. the SIM card 214. Further, the CP 213 provides services, such as a voice communication service, a video communication service, a short message service, and a packet data service, to a user.

Further, the CP 213 controls data transmission and/or reception of the communication module 230. Although the elements including the CP 213, the power management module 295, and the memory 220 are illustrated as being separate from the AP 211 in FIG. 2, the AP 211 may be implemented to include at least some, e.g. the CP 213, of the aforementioned elements according to an embodiment of the present invention.

According to an embodiment of the present invention, the AP 211 or the CP 213 loads a command and/or data received from at least one of a non-volatile memory and/or other elements connected thereto in a volatile memory and then processes the same. Further, the AP 211 or the CP 213 stores data received from and/or generated by at least one of the other elements in a non-volatile memory.

The SIM card 214 is a card implementing a SIM and is inserted in a slot formed at a position of an electronic apparatus. The SIM card 214 includes identification information, e.g., an Integrated Circuit Card IDentifier (ICCID), and/or subscriber information, e.g. an International Mobile Subscriber Identity (IMSI).

The memory 220 includes an internal memory 222 and/or an external memory 224. The memory 220 may be, for example, similar to the memory 130 as illustrated in FIG. 1. The internal memory 222 of FIG. 2 includes at least one of a volatile memory, e.g., a Dynamic Random Access Memory (DRAM), a Static RAM (SRAM), a Synchronous Dynamic RAM (SDRAM), or the like, and/or a non-volatile memory, e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like. According to an embodiment of the present invention, the internal memory 222 has a form of a Solid State Drive (SSD). The external memory 224 further includes a flash drive, for example, a Compact Flash (CF) drive, a Secure Digital (SD) drive, a Micro Secure Digital (Micro-SD) drive, a Mini Secure Digital (Mini-SD) drive, an extreme Digital (xD) drive, a memory stick, and/or the like.

The communication module 230 includes a wireless communication module 231 and/or a Radio Frequency (RF) module 234. The communication module 230 may be, for example, similar to the communication module 160 as illustrated in FIG. 1. The wireless communication module 231 in FIG. 2 may include, for example, a WiFi module 233, a BT module 235, a GPS receiving module 237, and/or a NFC module 239. For example, the wireless communication module 231 can provide a wireless communication function by using a wireless frequency. Additionally or alternatively, the wireless communication module 231 may include a network interface, e.g., a LAN card, and/or a modem for connecting the hardware 200 with a network, (e.g., Internet, a LAN, a WAN, a telecommunication network, a cellular network, a satellite network, a Plain Old Telephone Service (POTS), and/or the like). The NFC module 239 includes a connection node for connection to an NFC antenna.

The RF module 234 performs data transmission/reception, for example, transmission and/or reception of an RF signal and/or a paged electronic signal. The RF module 234 may include, for example, a transceiver, a Power Amplifier Module (PAM), a frequency filter, a Low Noise Amplifier (LNA), and/or the like, which are not illustrated in FIG. 2. Further, the RF module 234 may further include a component for transmitting and/or receiving an electromagnetic wave in free space in a wireless and/or wired communication, for example, a conductor, a conductive wire, and/or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, Blue (RGB) sensor 240H, a bio-physical sensor 240I, a temperature/humidity sensor 240J, an illuminance sensor 240K, and an Ultra Violet (UV) sensor 240M. The sensor module 240 can measure a physical property and/or detect an operation state of an electronic apparatus and convert the measured and/or detected information to an electric signal. Additionally/alternatively, the sensor module 240 may include, for example, an olfactory sensor, such as an E-nose sensor, an Electro MyoGraphy (EMG) sensor, an Electro EncephaloGram (EEG) sensor, an Electro CardioGram (ECG) sensor, a fingerprint sensor, or the like. The sensor module 240 may further include a control circuit for controlling at least one sensor included in the sensor module 240.

The user input module 250 includes a touch panel 252, a digital pen sensor 254, a key 256, or an ultrasonic input device 258. The user input module 250 may be, for example, the user input module 140 illustrated in FIG. 1. The touch panel 252 of FIG. 2 recognizes a touch input in at least one scheme among, for example, a capacitive scheme, a resistive scheme, an infrared scheme, and an ultrasonic scheme. Further, the touch panel 252 further includes a controller. In the case of the capacitive scheme, the touch panel can recognize an indirect touch as well as a direct touch. The "direct touch scheme" refers to a scheme in which a conductive object (e.g. a finger or stylus pen) makes direct contact with a touch screen. According to an embodiment of the present invention, the "indirect touch scheme" refers to a scheme in which a conductive material wrapped by a non-conductive material (e.g. a finger in a glove) approaches a touch screen or the non-conductive material (e.g. a glove in which a finger is placed) contacts the touch screen. According to another embodiment of the present invention, the "indirect touch scheme" refers to a scheme in which a finger touches a non-conductive object in a state in which the non-conductive object (for example, a cover for protecting a touch screen) is placed on the touch screen and is in contact with the touch screen. According to another embodiment of the present invention, the "indirect touch scheme" refers to a scheme commonly called "hovering", in which a finger is not in contact with a touch screen, but approaches the touch screen within a predetermined distance so as to generate an event. The touch panel 252 may further include a tactile layer. In this event, the touch panel 252 provides a tactile response to a user. The touch panel 252 may be installed on a screen (i.e. touch screen) of the display module 260. For example, the touch panel 252 may be implemented in an add-on type in which the touch panel is located on the touch screen, or an on-cell type or an in-cell type in which the touch panel is inserted in the display module 260.

The pen sensor 254 may be implemented, for example, in the same and/or similar method as that of receiving a user's touch input and/or by using a separate sheet for recognition. For example, a keypad and/or a touch key may be used as the key 256. The ultrasonic input device 258 is a device that can identify data by detecting a sound wave from a terminal to a microphone, e.g., a microphone 288, through a pen generating an ultrasonic wave signal, and can achieve wireless recognition. According to an embodiment of the present invention, the hardware 200 can receive a user input from an external device, e.g., a network, a computer, and/or a server connected with the communication module 230, by using the communication module 230.

The display module 260 includes a panel 262 and/or a hologram 264. The display module 260 may be, for example, similar to the display module 150 as illustrated in FIG. 1. For example, the panel 262 in FIG. 2 may be a Liquid Crystal Display (LCD) and/or an Active Matrix-Organic Light Emitting Diode (AM-OLED). The panel 262 may be implemented to be, for example, flexible, transparent, and/or wearable. The panel 262 may be configured by the touch panel 252 and one module. The hologram 264 may display a three dimensional image in the air by using an interference of light. According to an embodiment of the present invention, the display module 260 may further include a control circuit for controlling the panel 262 and/or the hologram 264.

The interface 270 may include, for example, a High-Definition Multimedia Interface (HDMI) 272, a Universal Serial Bus (USB) 274, a projector 276, and a D-subminiature (D-sub) 278. Additionally or alternatively, the interface 270 may include, for example, a SD drive, a Multi-Media Card (MMC), and/or an Infrared Data Association (IrDA) interface.

The audio codec 280 can bilaterally convert a voice and an electrical signal to each other. The audio codec 280 converts voice information input and/or output through, for example, a speaker 282, a receiver 284, an earphone 286, and/or the microphone 288.

The camera module 291 is a device capable of photographing a still image and a moving image, and includes at least one image sensor, e.g., a front lens and/or a rear lens, an Image Signal Processor (ISP), and/or a flash LED according to an embodiment of the present invention.

The power management module 295 manages power of the hardware 200. Although not illustrated, the power management module 295 may include, for example, a Power Management IC (PMIC), a charger IC, and/or a battery gauge.

The PMIC may be mounted in, for example, an IC and/or an SoC semiconductor. Charging methods may be classified into a wired charging method and a wireless charging method. The charger IC can charge a battery and can prevent introduction of over-voltage and/or over-current from a charger. According to an embodiment of the present invention, the charger IC may include a charger IC for at least one of the wired charging method and the wireless charging method. A magnetic resonance scheme, a magnetic induction scheme, and/or an electromagnetic scheme can be exemplified as the wireless charging method, and an additional circuit for wireless charging, such as a coil loop circuit, a resonance circuit, a rectifier circuit, and the like may be added.

The battery gauge can measure, for example, a residual quantity of the battery 296, and a voltage, a current, and/or a temperature during the charging. The battery 296 can supply power by generating electricity, and may be, for example, a rechargeable battery.

The indicator 297 may display a specific state, for example, a booting state, a message state, and/or a charging state of the hardware 200 and/or a part of the hardware, e.g., the AP 211. The motor 298 can convert an electrical signal into a mechanical vibration.

Although not illustrated, the hardware 200 may include a processing unit, e.g., a GPU for supporting a mobile TV. The processing unit for supporting a mobile TV can process media data according to a standard of Digital Multimedia Broadcasting (DMB), Digital Video Broadcasting (DVB), media flow, or the like. Each of elements of the hardware according to the present invention may be configured by one or more components, which may have different names according to the type of the electronic apparatus. The hardware according to the present disclosure may include at least one of the aforementioned elements and/or may further include other additional elements, and/or some of the aforementioned elements may be omitted. Further, some of the elements of the hardware according to the present invention may be combined into one entity, which can perform the same functions as those of the elements before the combination.

The term "module" used in the present invention may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present invention may include at least one of an Application-Specific IC (ASIC) chip, a Field-Programmable Gate Arrays (FPGA), and a programmable-logic device for performing operations which are known and/or will be developed hereinafter.

Figure 3:
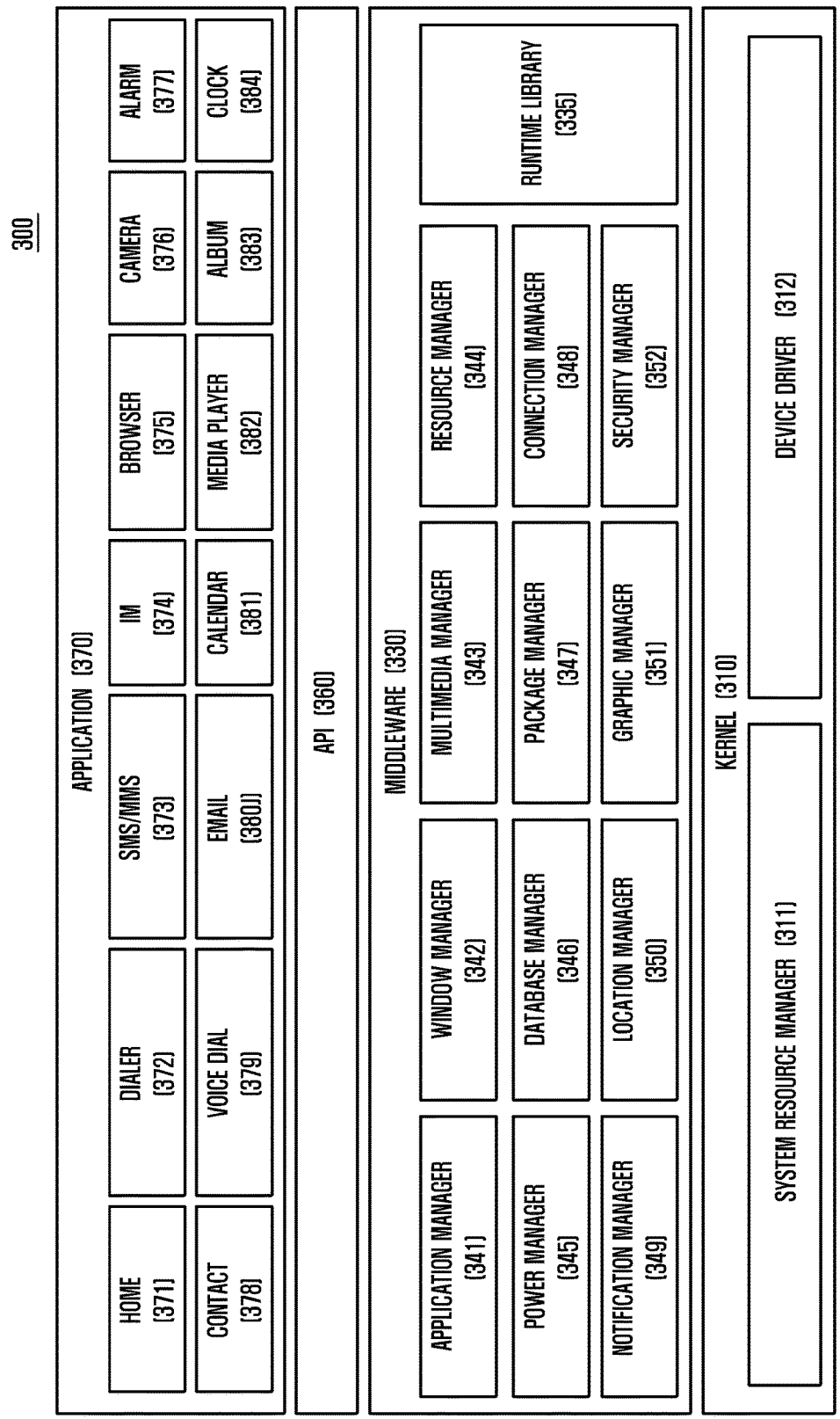
FIG. 3 is a block diagram of a programming module according to an embodiment of the present invention.

FIG. 3 is a block diagram illustrating a programming module 300 according to an embodiment of the present invention.

Referring to FIG. 3, the programming module 300 may be included, e.g. stored, in the electronic apparatus 100, e.g. the memory 130, as illustrated in FIG. 1. At least a part of the programming module 300 may be configured in software, firmware, hardware, and/or combinations of two or more thereof. The programming module 300 may include an OS that is implemented in hardware, e.g., the hardware 200 to control resources related to an electronic device, e.g., the electronic device 100, and/or various applications. e.g., applications 370, driven by the OS. For example, the OS may be Android, iOS, Windows, Symbian, Tizen, Bada, or the like. Referring to FIG. 3, the programming module 300 includes a kernel 310, middleware 330, an API 360, and the applications 370.

The kernel 310, which may be like the kernel 131, includes a system resource manager 311 and/or a device driver 312. The system resource manager 311 may include, for example, a process manager, a memory manager, and a file system manager. The system resource manager 311 controls, allocates, and/or collects system resources. The device driver 312 may include, for example, a display driver, a camera driver, a Bluetooth driver, a shared memory driver, a USB driver, a keypad driver, a WiFi driver, and an audio driver. Further, according to an embodiment of the present invention, the device driver 312 may include an Inter-Process Communication (IPC) driver.

The middleware 330 includes a plurality of modules implemented in advance for providing functions commonly used by the applications 370. Further, the middleware 330 provides the functions through the API 360 such that the applications 370 can efficiently use restricted system resources within the electronic apparatus. For example, as shown in FIG. 3, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment of the present invention, the runtime library 335 may perform an input/output, memory management, and/or a function for an arithmetic function.

The application manager 341 manages a life cycle of at least one of the applications 370. The window manager 342 can manage Graphical User Interface (GUI) resources used by a screen. The multimedia manager 343 detects formats used for reproduction of various media files, and encodes and/or decodes a media file by using a codec suitable for the corresponding format. The resource manager 344 manages resources such as source code, a memory, and a storage space of at least one of the applications 370.

The power manager 345 manages a battery and/or power, while operating with a Basic Input/Output System (BIOS), and provides power information used for operation. The database manager 346 manages generation, search, and/or change of a database to be used by at least one of the applications 370. The package manager 347 manages installation and/or an update of an application distributed in a form of a package file.

For example, the connectivity manager 348 can manage wireless connectivity such as Wi-Fi or Bluetooth. The notification manager 349 displays and/or notifies of an event, such as an arrival of a message, a promise, a proximity notification, and the like, in such a way that does not disturb a user. The location manager 350 manages location information of an electronic apparatus. The graphic manager 351 manages a graphic effect provided to a user, and/or a user interface related to the graphic effect. The security manager 352 provides all security functions used for system security and/or user authentication. According to an embodiment of the present invention, when an electronic apparatus, e.g., the electronic apparatus 100, has a telephone call function, the middleware 330 may further include a telephony manager for managing a voice and/or video communication function of the electronic apparatus.

The middleware 330 may generate and use a new middleware module through various functional combinations of the aforementioned internal element modules. The middleware 330 can provide modules specialized according to types of OSs in order to provide differentiated functions. Further, the middleware 330 may dynamically remove some of the existing elements and/or add new elements. Accordingly, the middleware 330 may exclude some of the elements described in the various embodiments of the present invention, further include other elements, and/or substitute the elements with elements having a different name and performing a similar function.

The API 360, which may be similar to the API 133, is a set of API programming functions, and may be provided with a different configuration according to the OS. For example, in a case of Android or iOS, one API set may be provided for each platform, and in a case of Tizen, two or more API sets may be provided.

The applications 370, which may include an application similar to the application 134, may include, for example, a preloaded application and/or a third party application. The applications 370 may include a home application 371, a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present invention is not limited thereto, and the applications 370 may include any other similar and/or suitable application.

At least a part of the programming module 300 can be implemented by commands stored in computer-readable storage media. When the commands are executed by at least one processor, e.g. the processor 210, at least one processor can perform functions corresponding to the commands. The computer-readable storage media may be, for example, the memory 204. At least a part of the programming module 300 can be implemented, e.g. executed, by, for example, the processor 210. At least a part of the programming module 300 may include, for example, a module, a program, a routine, a set of instructions and/or a process for performing at least one function.

The titles of the aforementioned elements of the programming module, e.g. the programming module 300, according to the present invention may vary depending on the type of the OS. The programming module according to the present invention may include at least one of the aforementioned elements and/or may further include other additional elements, and/or some of the aforementioned elements may be omitted. The operations performed by a programming module and/or other elements according to the present invention may be processed through a sequential, parallel, repetitive, and/or heuristic method, and some of the operations may be omitted and/or other operations may be added.

FIGS. 4A-4M are touch screens illustrating a procedure of moving an object in response to the user's gesture according to an embodiment of the present invention.

Referring to FIGS. 4A-4D, the processor (e.g. processor 211) of the electronic device (e.g. electronic device 200) can control the display module (e.g. display module 260) so as to display a number of objects on the touch screen. The user can make a pick up gesture with at least two physical bodies (e.g. two fingers) with regard to the touch screen. The pick up gesture may be a gesture of picking up at least one object with at least two fingers. For example, the pick-up gesture can be completed by successively performing a) thumb's touch down T1 and forefinger's touch down T2, b) pinch in 410, c) touch coupling T3, and d) touch up. As used herein, the touch down may be a gesture of touching different areas of the touch screen with thumb and forefinger, respectively. The pinch in may be a gesture of moving thumb and forefinger adjacent to each other while touching the touch screen. The touch coupling may be a gesture of touching thumb and forefinger to each other. The touch up may be a gesture of releasing the touch coupling from the touch screen.

The touch panel (e.g. touch panel 252) can sense the above-mentioned pick up gesture, generate an event corresponding to the pick up gesture, and deliver the event to the processor 211. The processor 211 can analyze the pick up gesture event, which has been received from the touch panel 252, and determine respective touch areas of physical bodies. The processor 211 can recognize object(s) included at least partially in a touch area (e.g. touch area 421). In addition, the processor 211 can recognize object(s) included at least partially in a touch area (e.g. touch area 422). The processor 211 can decide whether any one of the object(s) included at least partially in the touch area 421 is identical to any one of the object(s) included at least partially in the touch area 422 or not.

When there is an identical object (e.g. object 430), the processor 211 can respond to a touch up and adopt a pick up mode as the operating mode of the electronic device 200. For example, the processor 211 can respond to the user's pick up gesture and control the display module (e.g. display module 260) so as to provide a visual feedback indicating that the object 430 is being picked up. For example, the visual feedback can include an operation of changing and displaying the attribute (e.g. color, size, transparency, shape, symbol, brightness, etc) of the corresponding object 430 to distinguish it from other objects. Meanwhile, the processor 211 can decide whether the touch area 421 and the touch area 422 at least partially overlap each other or not. When the touch areas at least partially overlap each other, the processor 211 can recognize that touch coupling T3 has occurred.

Referring to FIGS. 4E-4J, the user can hover down H1 regarding an object 430 and subsequently make a hovering movement 440. Hovering down H1 may be a gesture of bringing a physical body adjacent to the touch screen within a predetermined distance. In addition, hovering down H1 may be, for example, touch up, which releases the touch of a thumb and a forefinger, which are stuck together, from the touch screen (i.e. releasing the touch of touch coupling T3). The hovering movement 440 may be a gesture of moving physical bodies (e.g. a thumb and a forefinger stuck together) while being adjacent to the touch screen within a predetermined distance. Meanwhile, hovering up may be a gesture of moving a physical body away from the touch screen beyond the predetermined distance.

The touch panel 252 can sense hovering down H1 and hovering movement 440, generate events corresponding to the gestures, and deliver the events to the processor 211. In response to the gestures, the processor 211 can adopt a movement mode as the operating mode of the electronic device 200. That is, the processor 211 can move the object 430 according to the hovering movement 440. As a result, the area 461, in which the object 430 has been positioned, becomes empty. In addition, the object 430 may overlap another object. In that case, the processor 211 can move other objects 462, 463, 464, and 465 to fill the area 461. As a result, the area 466 becomes empty, and the processor 211 can move the object 430 to the area 466 in response to the user's gesture (e.g. hovering movement gesture) or automatically.

Although not illustrated, when there is no area to which the object 430 can move, the processor 211 can output a notification so that the user can recognize it. For example, the notification can include at least one of noti-sound, noti-popup, noti-vibration, noti-color, and noti-icon.

Figure 4A:
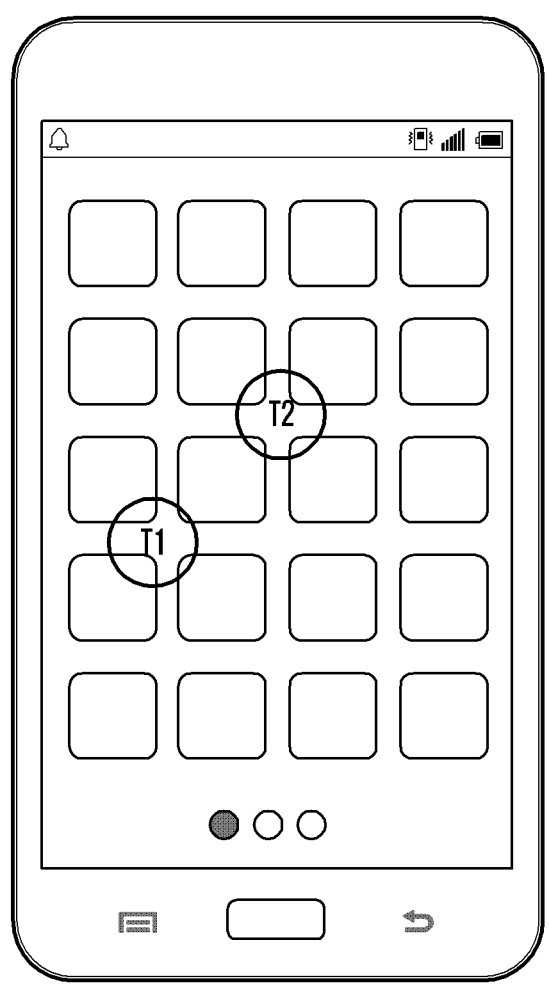
FIGS. 4A-4M are touch screens illustrating a procedure of moving an object in response to the user's gesture according to an embodiment of the present invention.
Figure 4B:
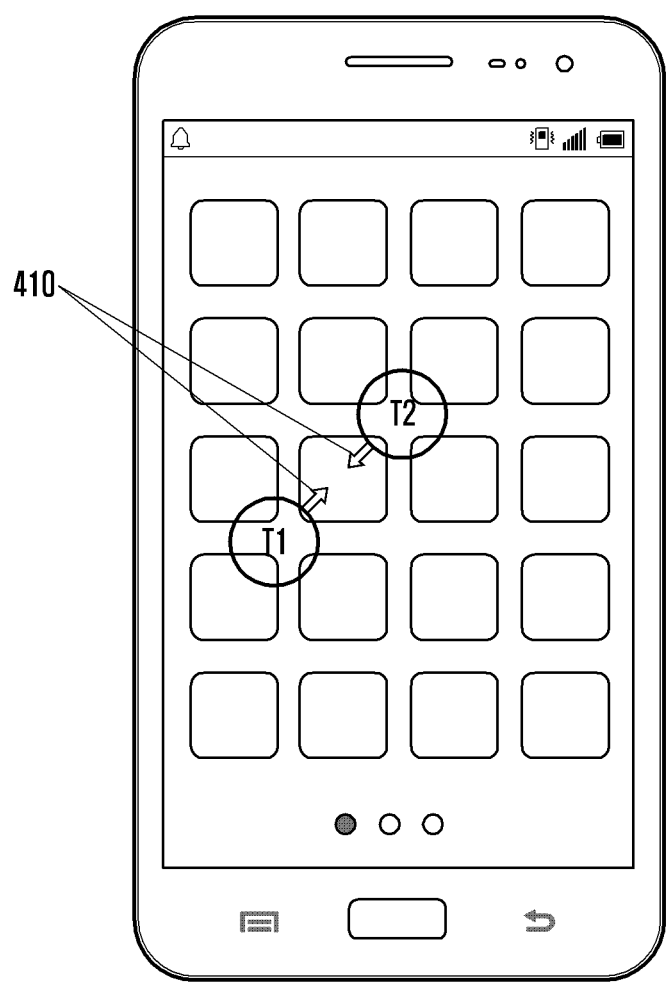
Figure 4C:
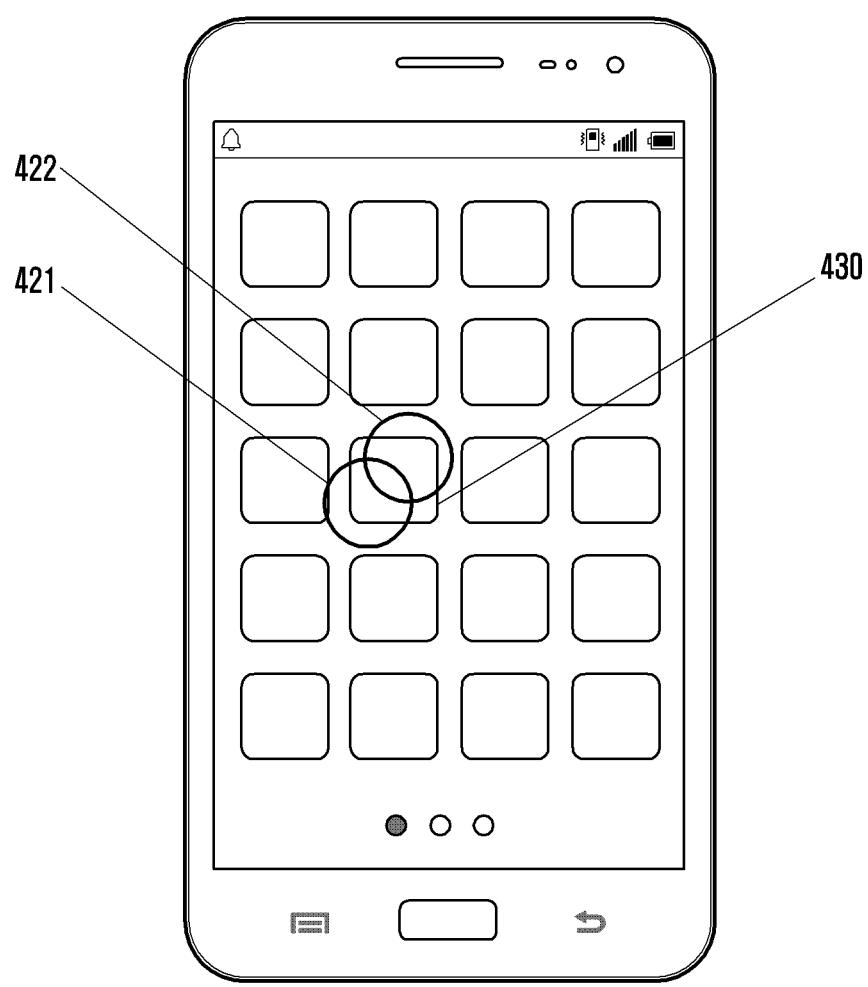
Figure 4D:
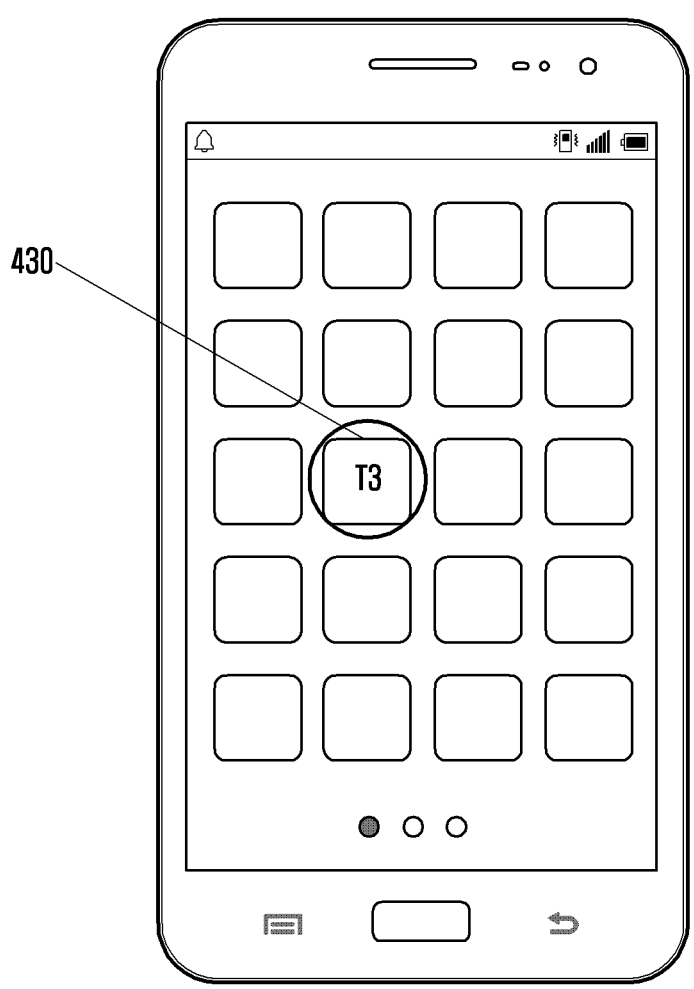
Figure 4E:
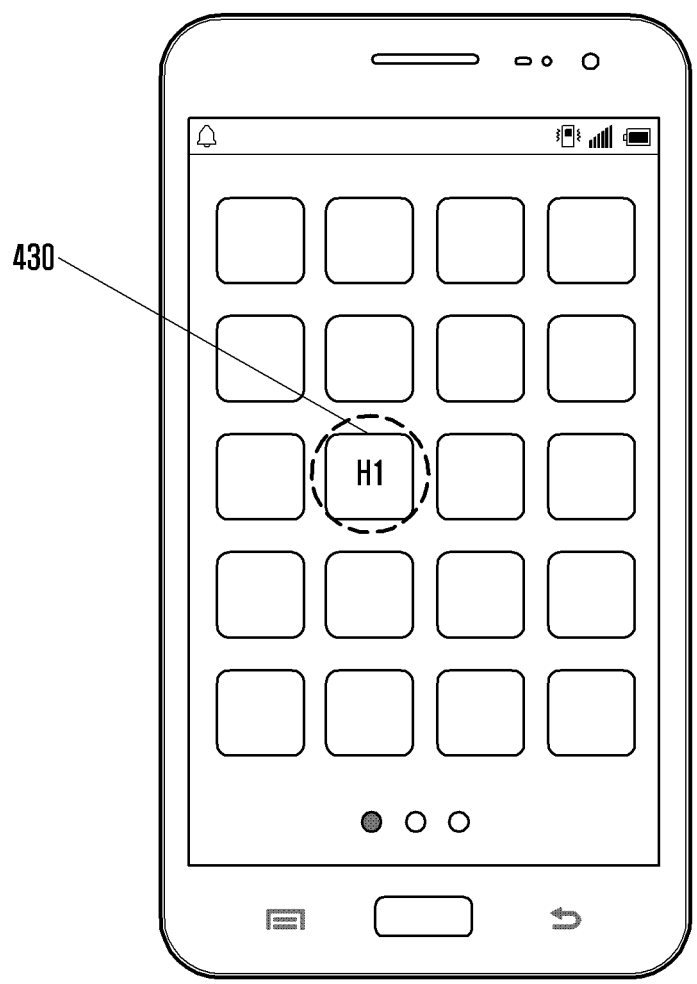
Figure 4F:
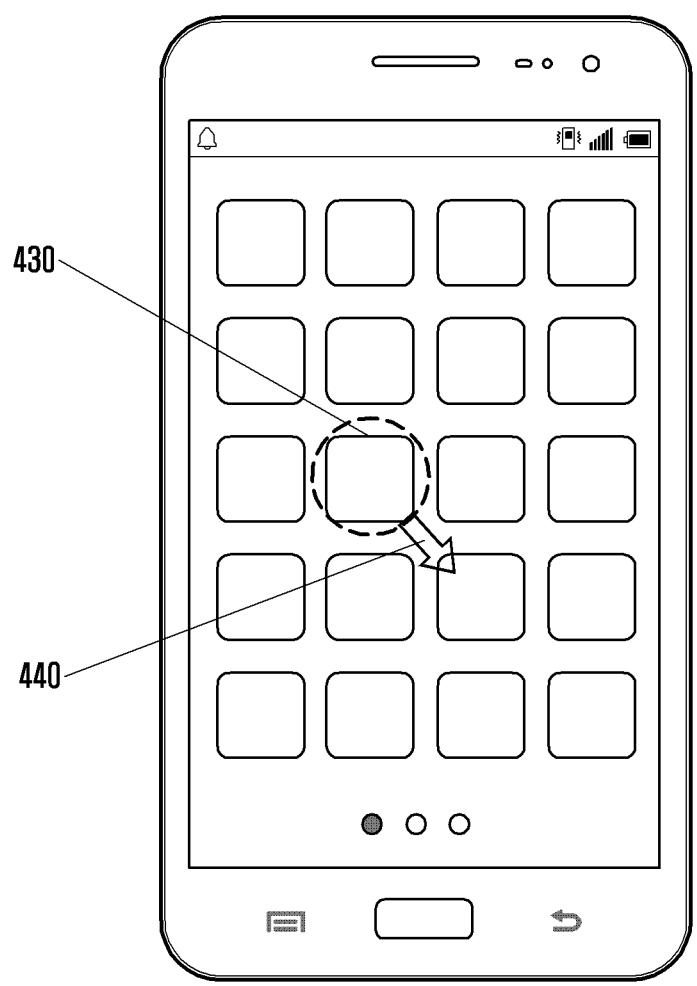
Figure 4G:
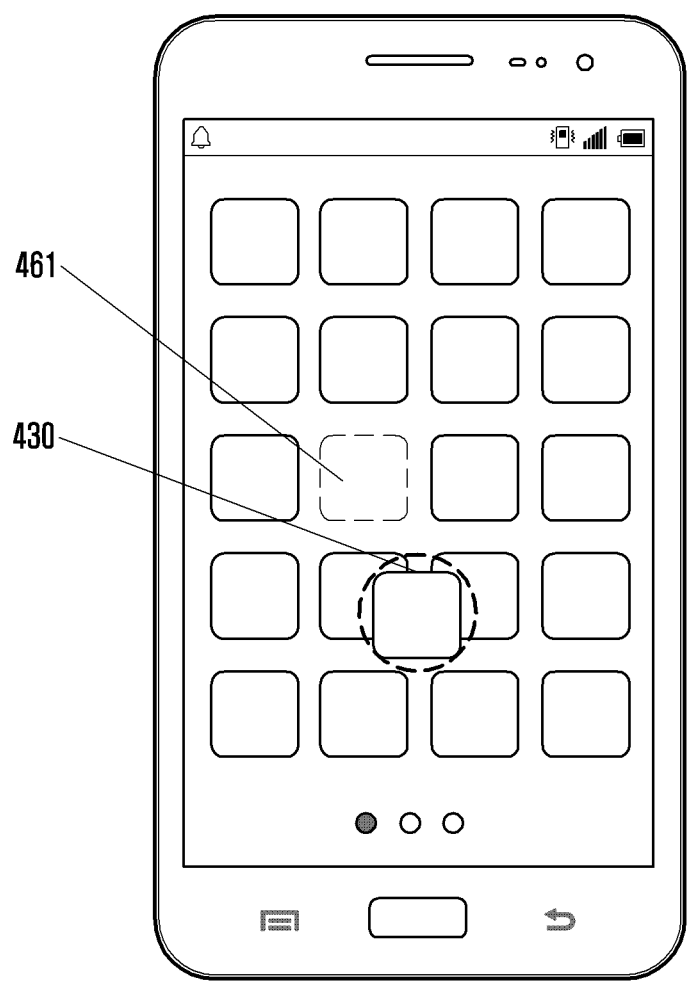
Figure 4H:
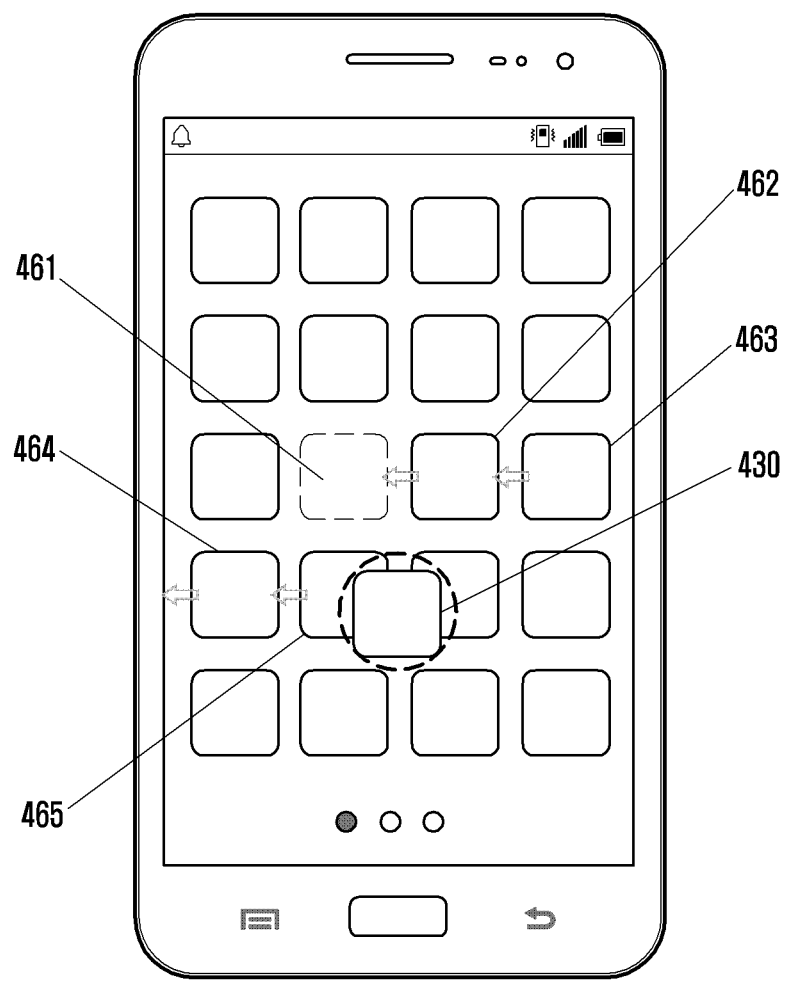
Figure 4I:
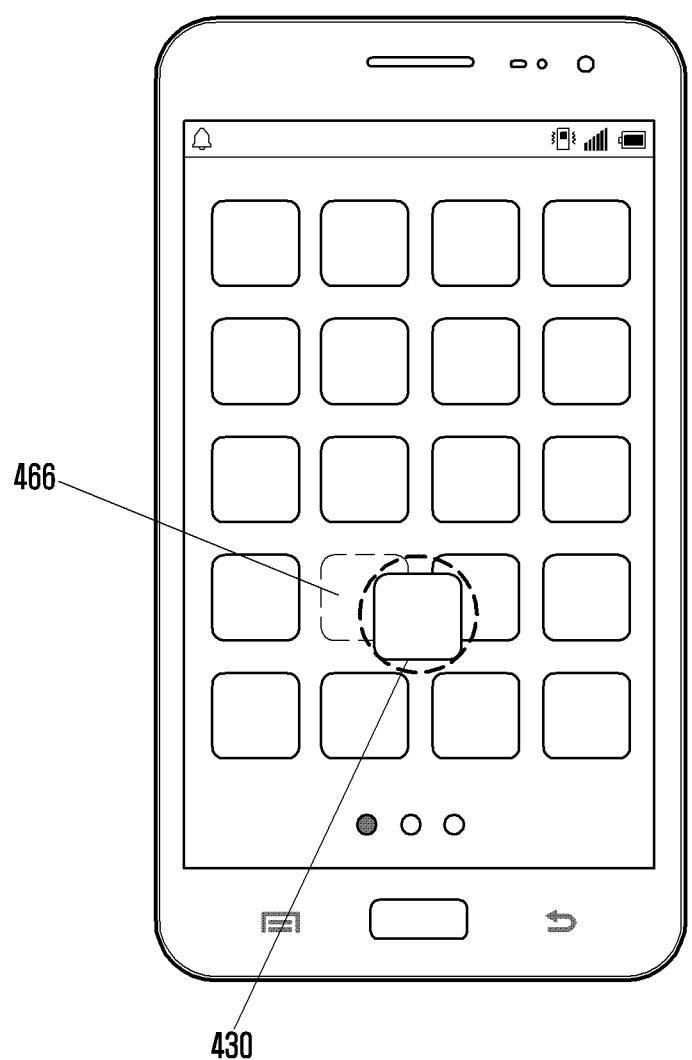
Figure 4J:
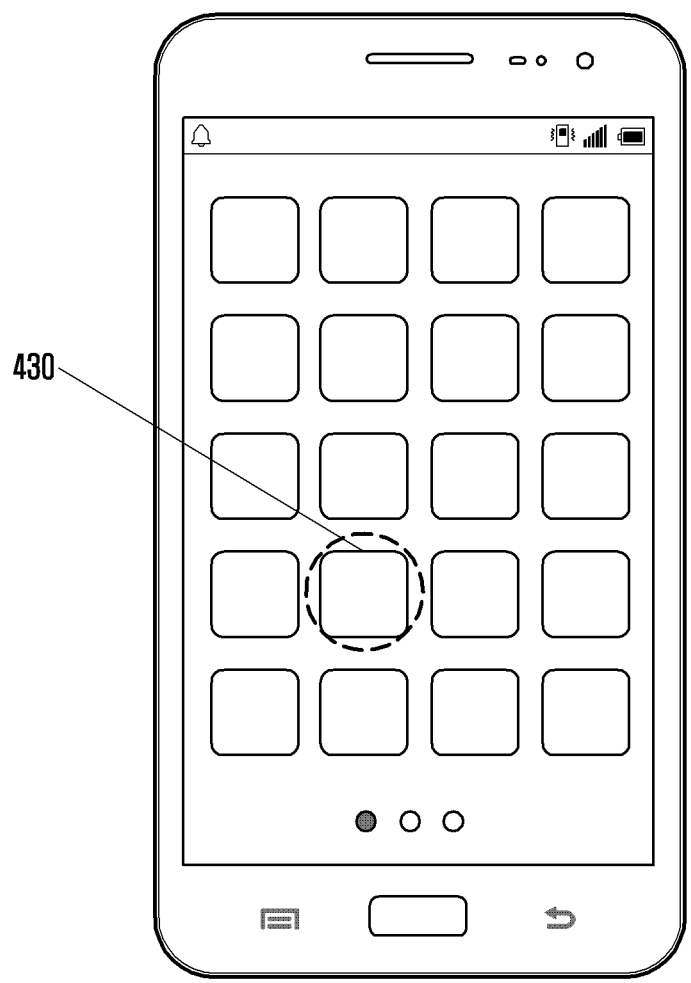
Figure 4K:
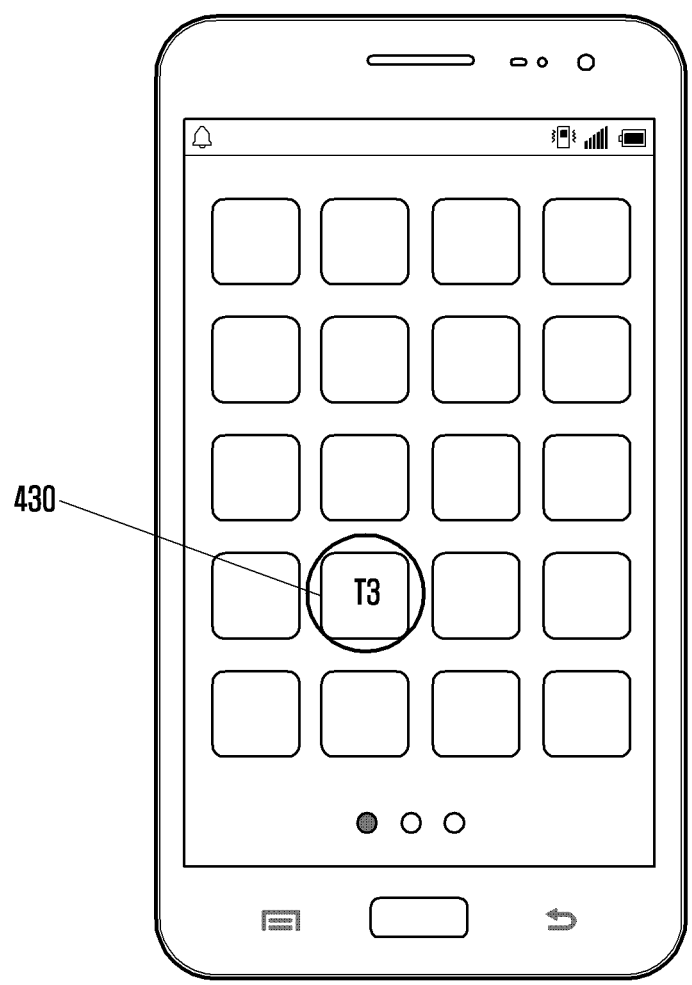
Figure 4L:
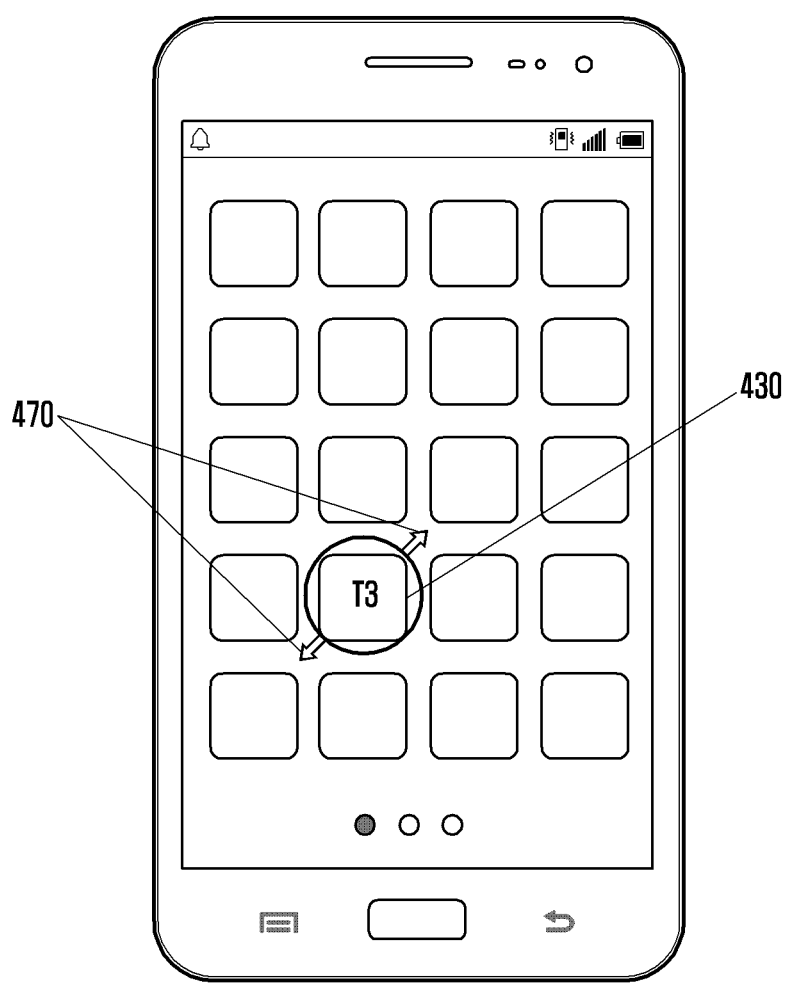
Figure 4M:
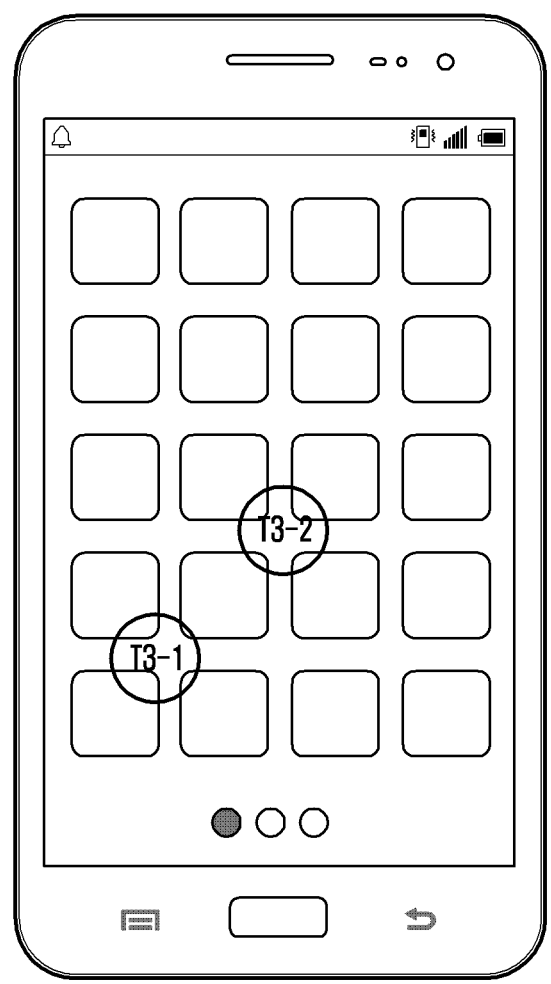
Figure 5A:
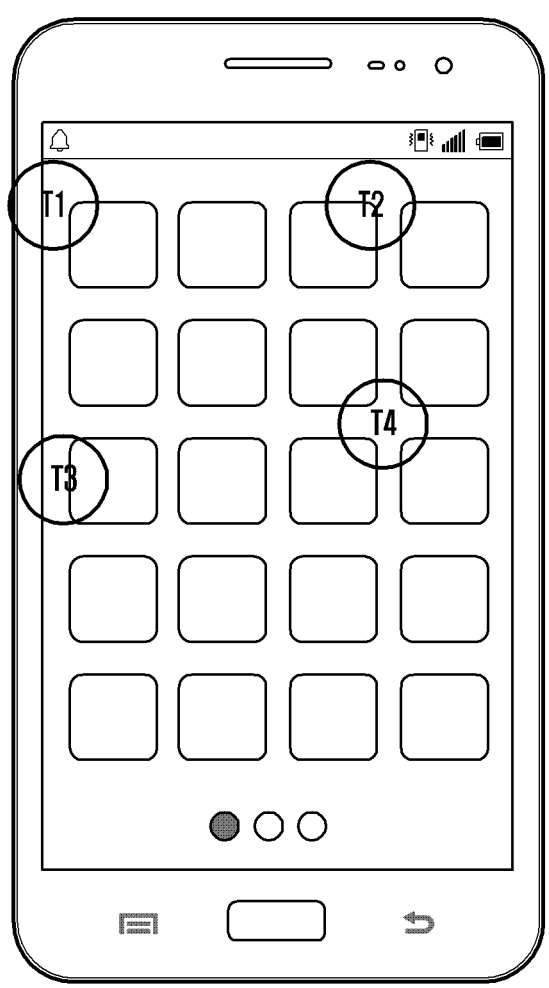
FIGS. 5A-5M are touch screens illustrating a procedure of moving an object in response to the user's gesture according to another embodiment of the present invention.
Figure 5B:
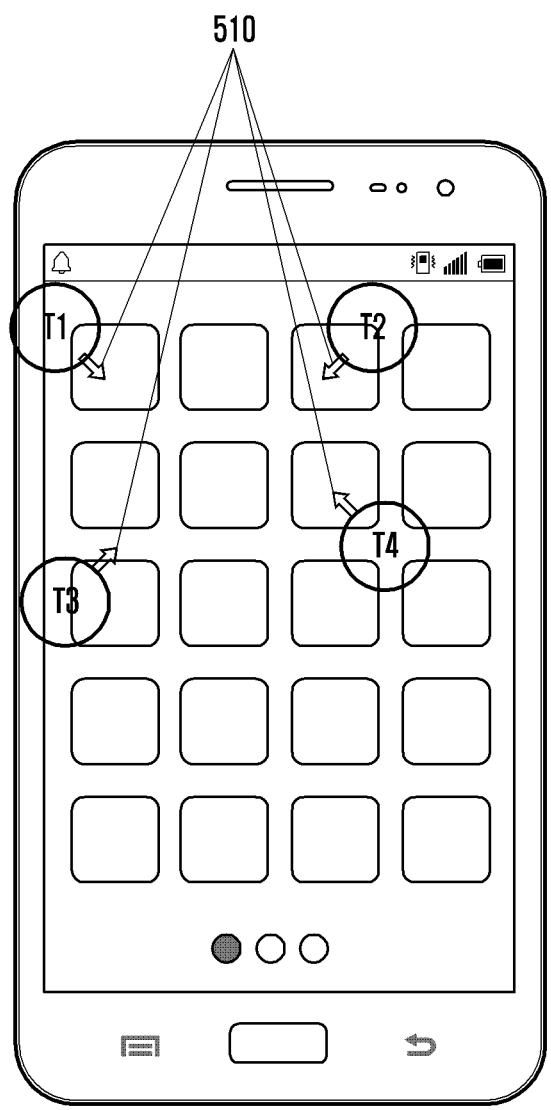
Figure 5C:
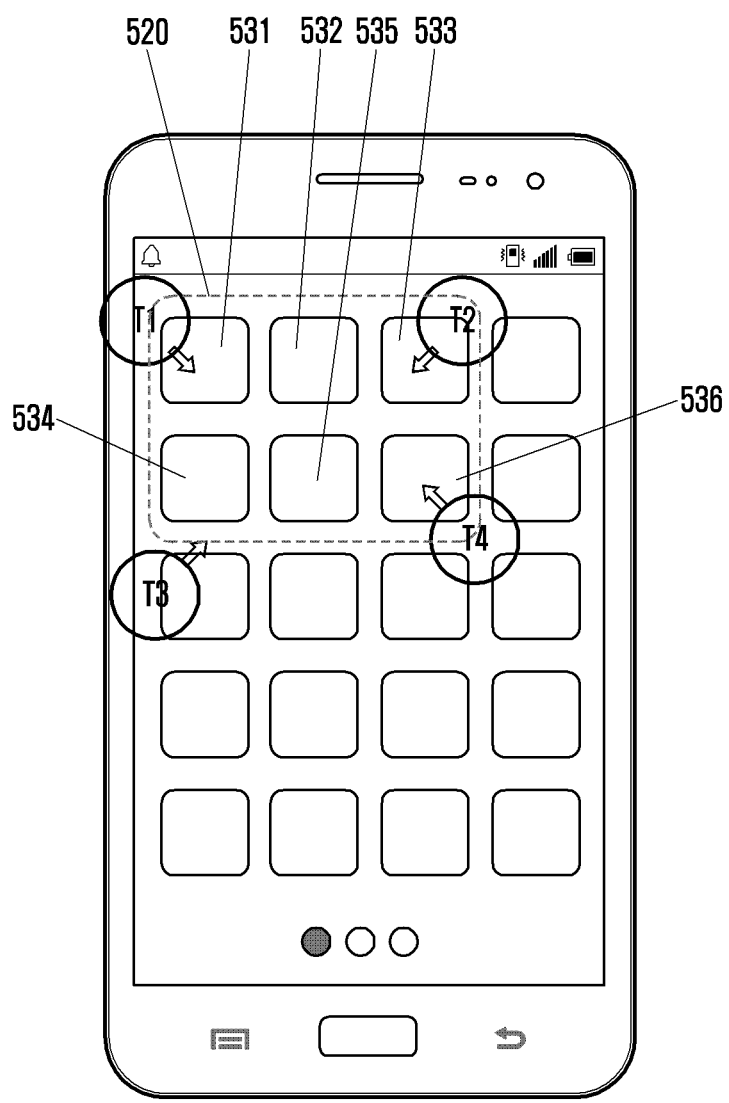
Figure 5D:
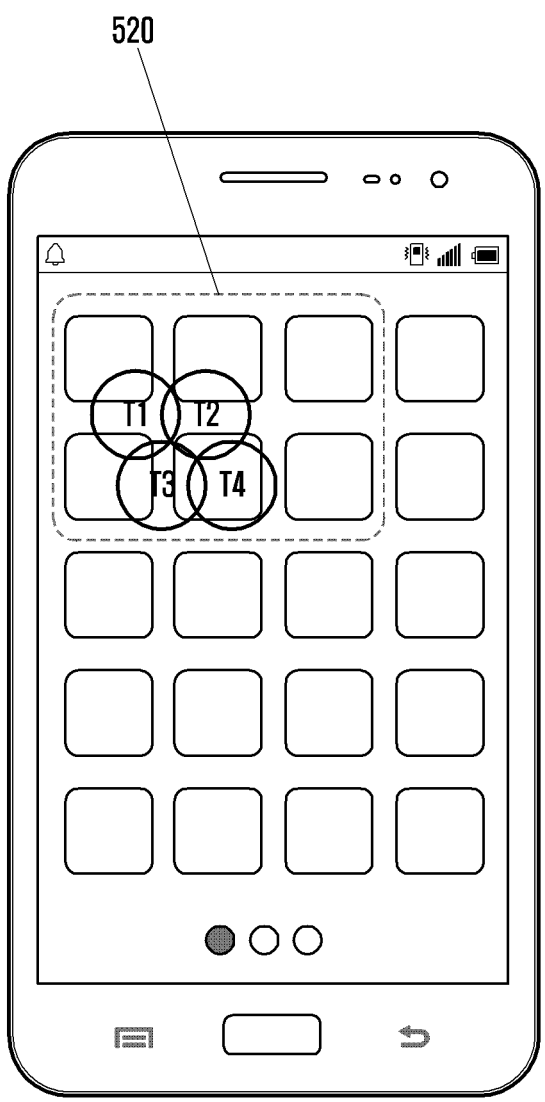
Figure 5E:
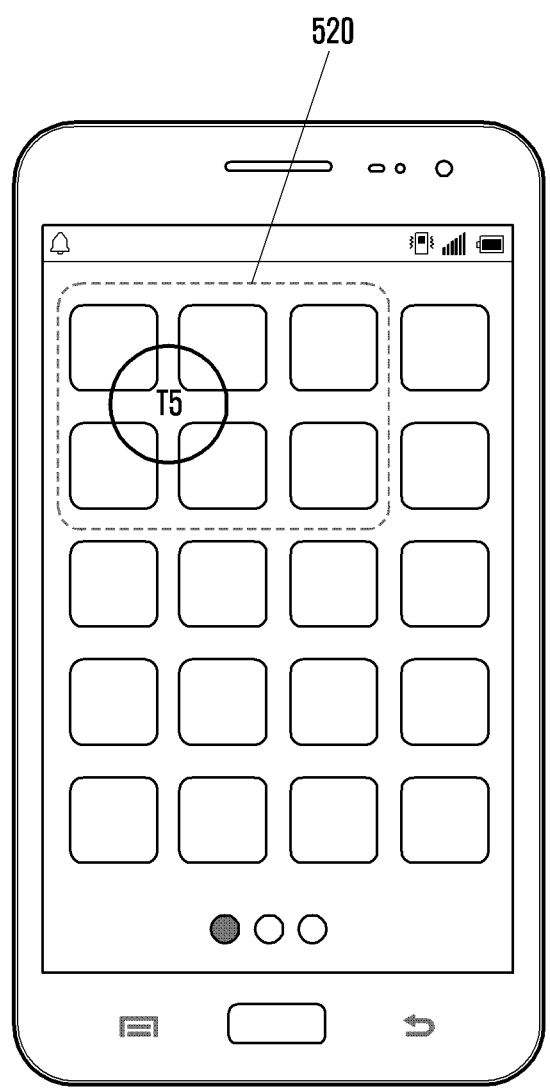
Figure 5F:
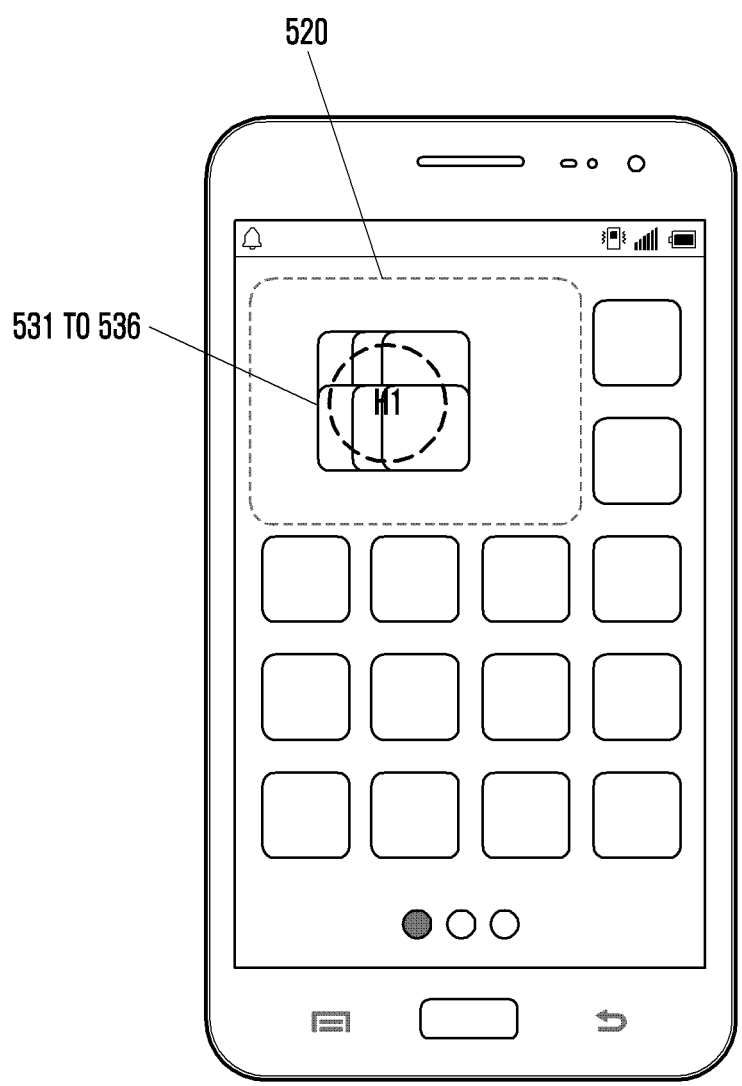
Figure 5G:
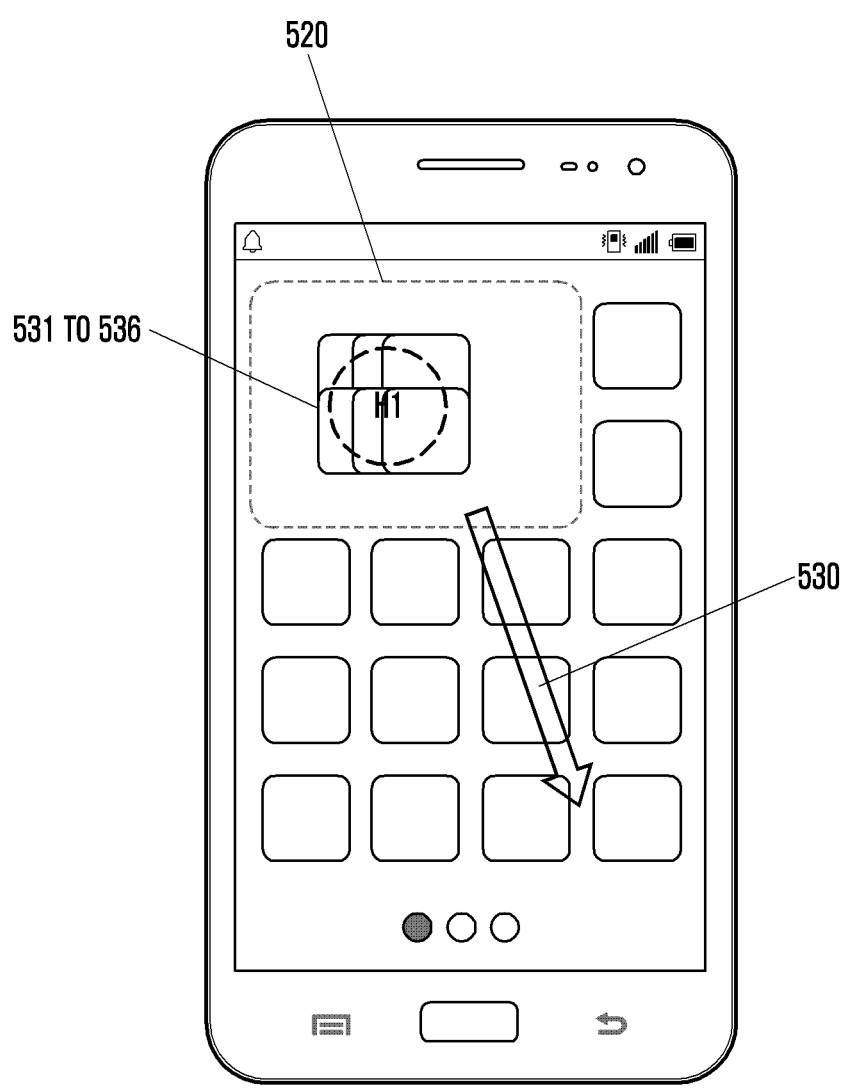
Figure 5H:
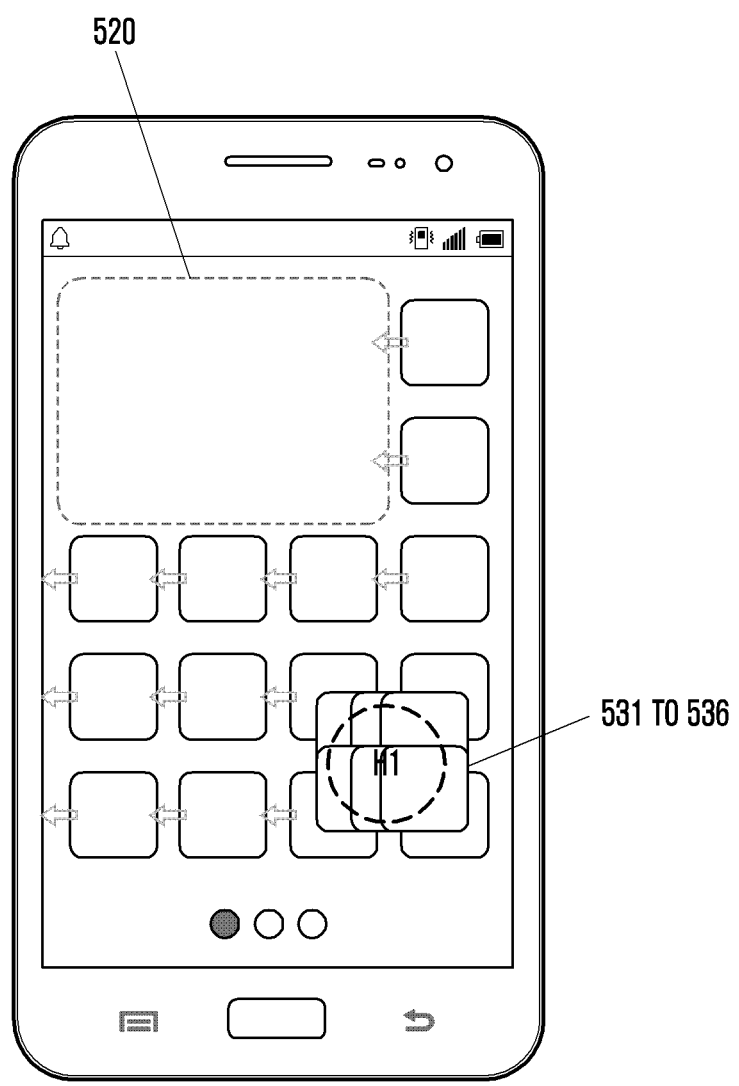
Figure 5I:
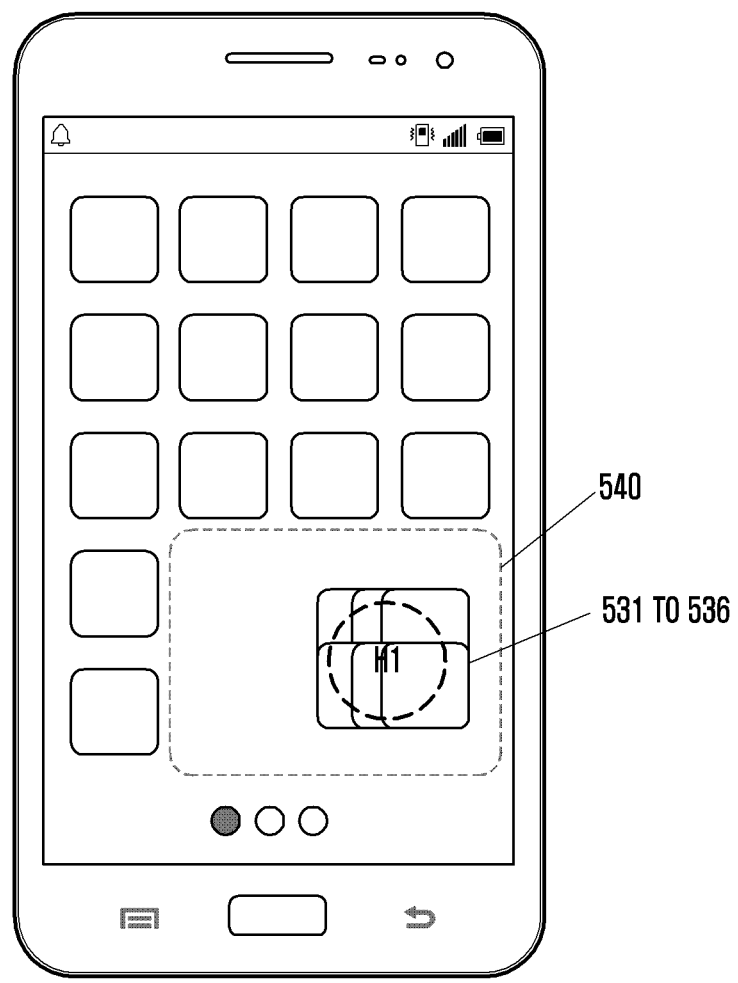
Figure 5J:
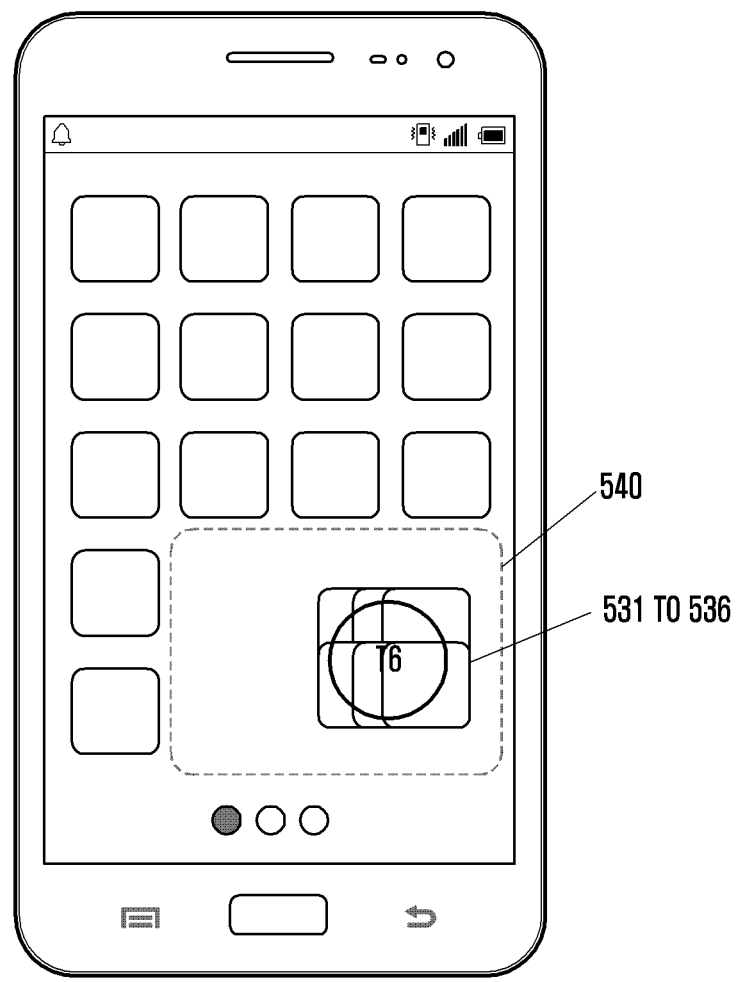
Figure 5K:
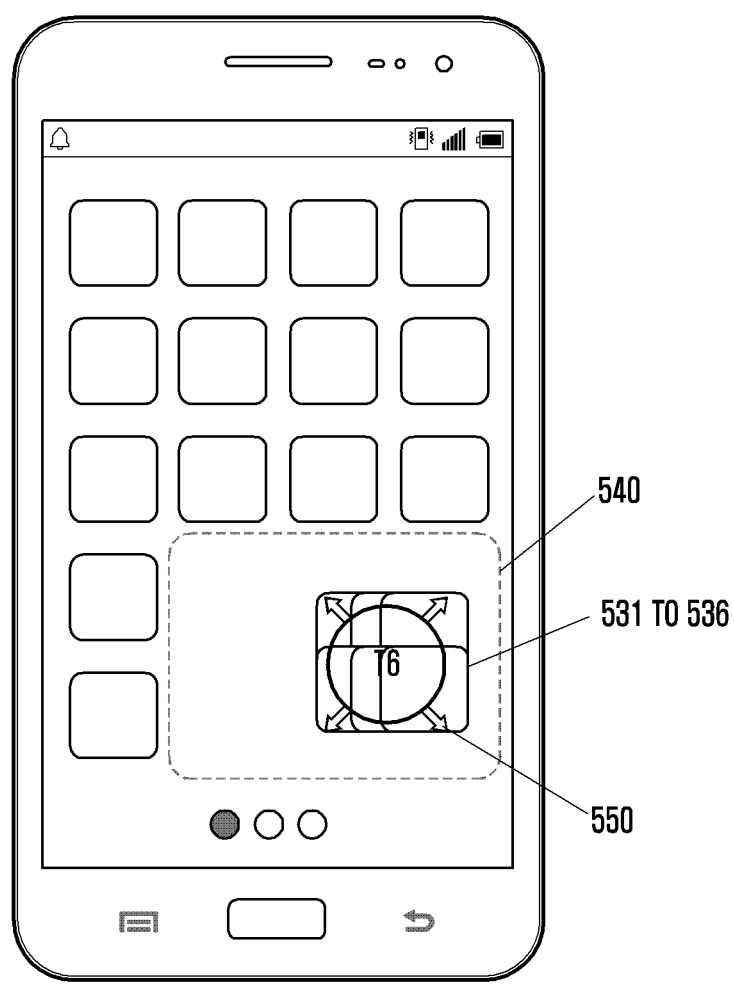
Figure 5L:
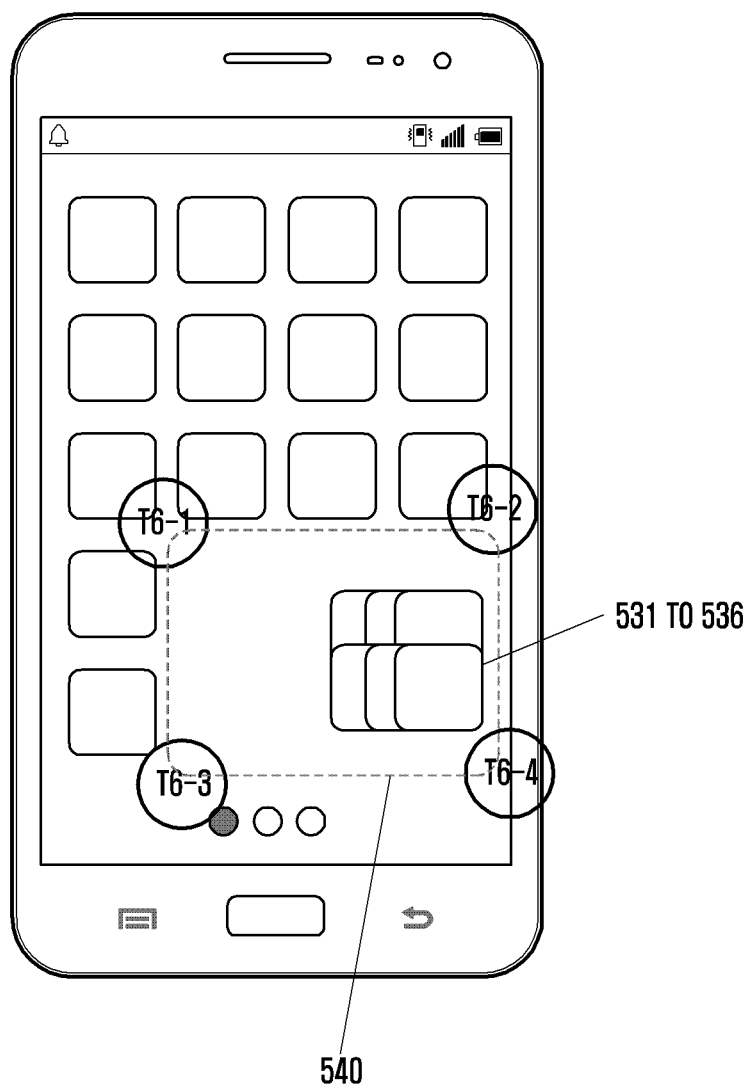
Figure 5M:
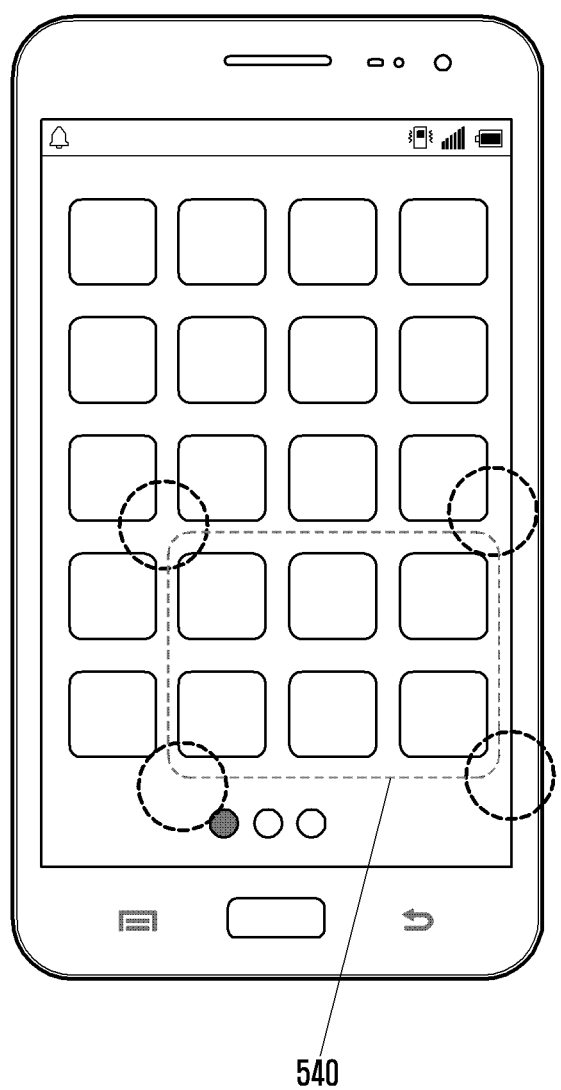

Referring to FIGS. 4K-4M, the user can make a put down gesture with regard to the object 430 using physical bodies (e.g. two fingers). For example, the put down gesture can be completed by successively performing touch down T3, pinch out 470, and touch ups (not illustrated). In this regard, the touch down T3 may be a gesture of touching the object 430 with thumb and forefinger, which are stuck together, for example. The pinch out 470 may be a gesture of moving thumb and forefinger away from each other while touching the touch screen. As a result, the touch down T3 can be separated into a number of touch downs (e.g. T3-1 and T3-2). Therefore, the pinch out may also be referred to as touch separation. The touch ups may be gestures of releasing the touch of thumb and forefinger, which have moved away from each other, from the touch screen.

The touch panel 252 can sense the above-mentioned put down gesture, generate an event corresponding to the put down gesture, and deliver the event to the processor 211. In response to the put down gesture, the processor 211 can complete the movement of the object 430. Specifically, the processor 211 can respond to touch down T3 and adopt a put down mode as the operating mode of the electronic device 200. For example, the processor 211 can display the object 430 in the same state as other objects. The processor 211 can respond to pinch out 470 (or touch down T3 being separated into T3-1 and T3-2) and recognize that the movement of the object 430 has been completed preliminarily. The processor 211 can respond to touch ups and recognize that the movement of the object 430 has been completed finally.

According to the present invention, the operating mode of the object 430 can be changed from the pick up mode to the movement mode, and from the movement mode to the put down mode. When the touch has been released in the put down mode, the movement of the object 430 can be completed. The operating mode of the object 430 can also be changed from the put down mode to the movement mode when, for example, touch up has occurred before touch down T3 is separated into T3-1 and T3-2, or when touch up has occurred after T3-1 and T3-2 have been coupled into T3 again.

Figure 10A:
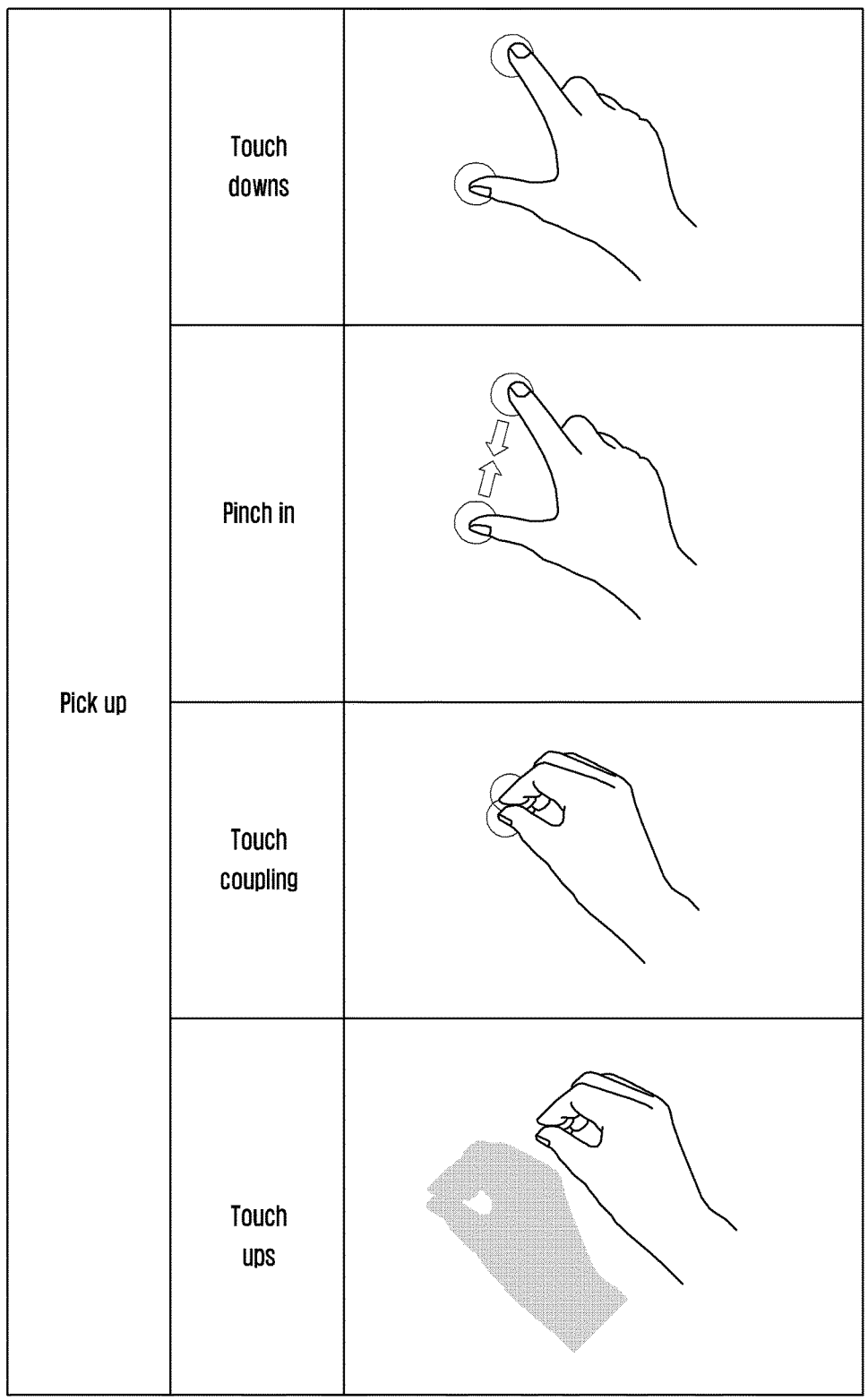
FIGS. 10A-10C are images expressing a pick up gesture, a hovering movement gesture and a put down gesture according to an embodiment of the present invention.
Figure 10B:
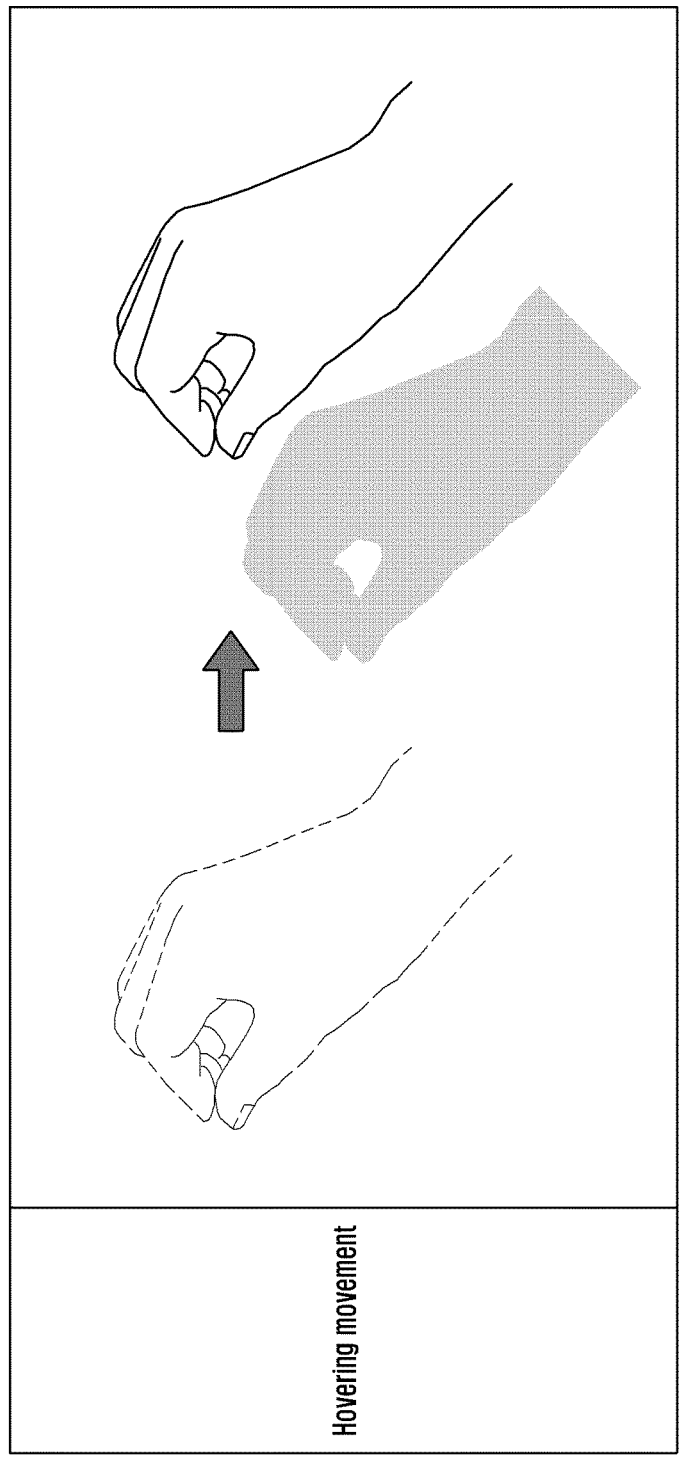
Figure 10C:
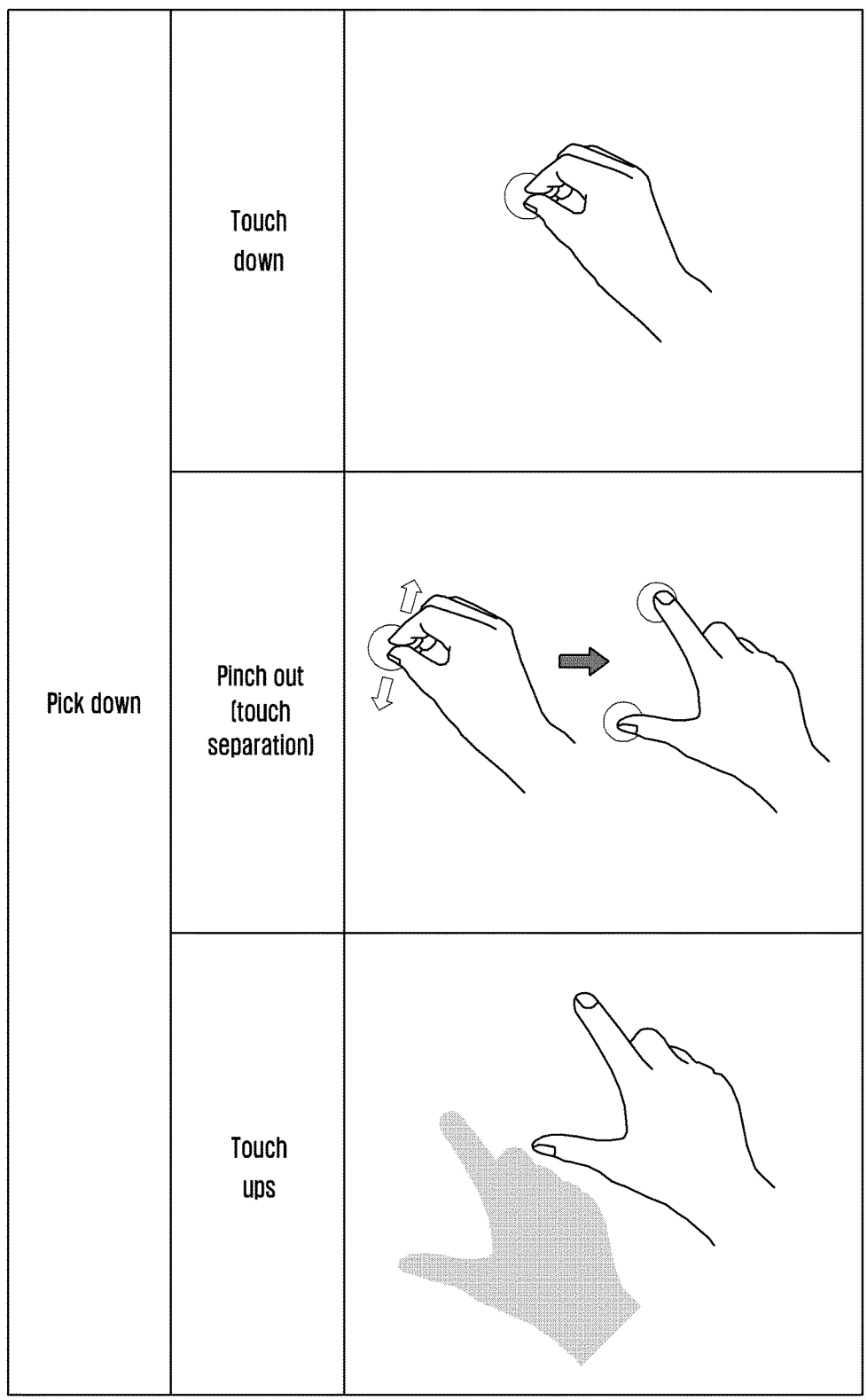

The pick up gesture, hovering movement gesture, and put down gesture according to the present invention can be expressed by images as shown in FIGS. 10A-10C.

It has been described in the above embodiment of the present invention that the processor, the display module, and the touch panel are a processor 211, a display module 260, and a touch panel 252, respectively. However, the present invention is not limited thereto. For example, an electronic device 100 can perform the role of the above-mentioned processor, and an electronic device 102 can perform the role of the above-mentioned display module and touch panel. And the electronic device 100 and the electronic device 102 can transmit/receive data for the above-mentioned pick up, movement, and put down procedures between each other. Such role assignment can also be applied in the same manner to other embodiments of the present invention described below.

FIGS. 5A-5M are touch screens illustrating a procedure of moving an object in response to the user's gesture according to another embodiment of the present invention.

Referring to FIGS. 5A-5D, the user can make a pick up gesture with regard to the touch screen using at least two physical bodies (e.g. four fingers). For example, the pick up gesture can be completed by successively performing a) left forefinger's touchdown T1, left thumb's touchdown T2, right forefinger's touch down T3, and right thumb's touch down T4, b) pinch in 510, c) touch coupling T5, and d) touch up (not illustrated).

In response to the pick up gesture, the processor (e.g. processor 211) can adopt a pick up mode as the operating mode of the electronic device 200. In response to the pinch in 510, the processor 211 can determine a movement target among objects displayed on the touch screen. For example, the processor 211 can calculate touch points (e.g. touch coordinates) corresponding to T1, T2, T3, and T4, respectively, confirm a quadrangular pick up area 520 having the touch points as respective vertices, and determine objects 531, 532, 533, 534, 535, and 536, which are included (or included at least partially, although not illustrated) in the pick up area 520, as movement targets.

Referring to FIGS. 5F-5I, the user can hover down H1 with regard to objects 531-536 and then make a hovering movement 530. In this regard, hovering down H1 may correspond to the above-mentioned touch up. In response to hovering down H1 (or touch up), the processor 211 can adopt a movement mode as the operating mode of the electronic device 200. First, the processor 211 can control the display module 260 so as to provide a visual feedback indicating that the objects 531-536 gather at the point of hovering down H1 (e.g. modify each object 531-536 as an icon and display it). In response to the hovering movement 530, the processor 211 can move the objects 531-536. As a result, the pick up area 520, in which the objects 531-536 have been positioned, becomes empty. In addition, the objects 531-536 may overlap another object. In that case, the processor 211 can move other objects to fill the pick up area 520. As a result, the area 540 becomes empty.

Referring to FIGS. 5J-5M, the user can make a put down gesture with regard to objects 531-536 using physical bodies (e.g. four fingers). The put down gesture can be completed by successively performing touch down T6, pinch out 550, and touch ups. In this case, the touch down T6 may be a gesture of touching objects 531-536 with left thumb, left forefinger, right thumb, and right forefinger, which are in contact with one another, for example. The pinch out 550 may be a gesture of moving the four fingers away from one another while touching the touch screen. Accordingly, the touch down T6 can be separated into a number of touch downs (e.g. T6-1, T6-2, T6-3, and T6-4). The touch ups may be gestures of releasing the touch downs T6-1, T6-2, T6-3, and T6-4 from the touch screen. The touch panel 252 can sense the above-mentioned put down gesture, generate an event corresponding to the put down gesture, and deliver the event to the processor 211. In response to the put down gesture, the processor 211 can complete the movement of the objects 531-536. Specifically, the processor 211 can respond to touch down T6 and adopt a put down mode as the operating mode of the electronic device 200. For example, the processor 211 can display the objects 531-536 in the same state as other objects. The processor 211 can respond to the pinch out 550 (or touch downs T6-1, T6-2, T6-3, and T6-4) and recognize that the movement of the objects 531-536 has been completed preliminarily. The processor 211 can respond to touch ups and recognize that the movement of the objects 531-536 has been completed finally. Accordingly, the processor 211 can control the display module 260 so as to provide a visual feedback indicating that the objects 531-536 are evenly distributed in the area 540.

Figure 6A:
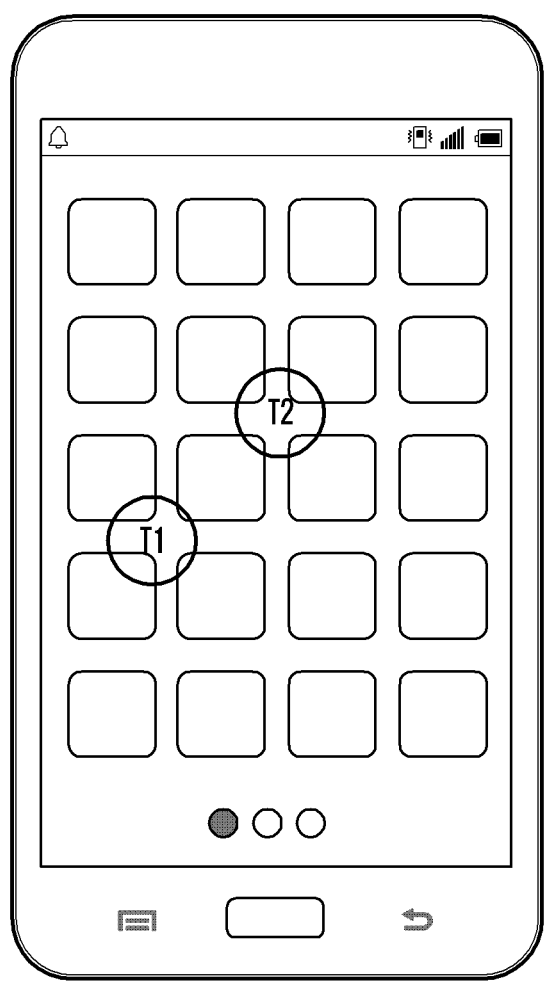
FIGS. 6A-6N are touch screens illustrating a procedure of moving an object in response to the user's gesture according to still another embodiment of the present invention.
Figure 6B:
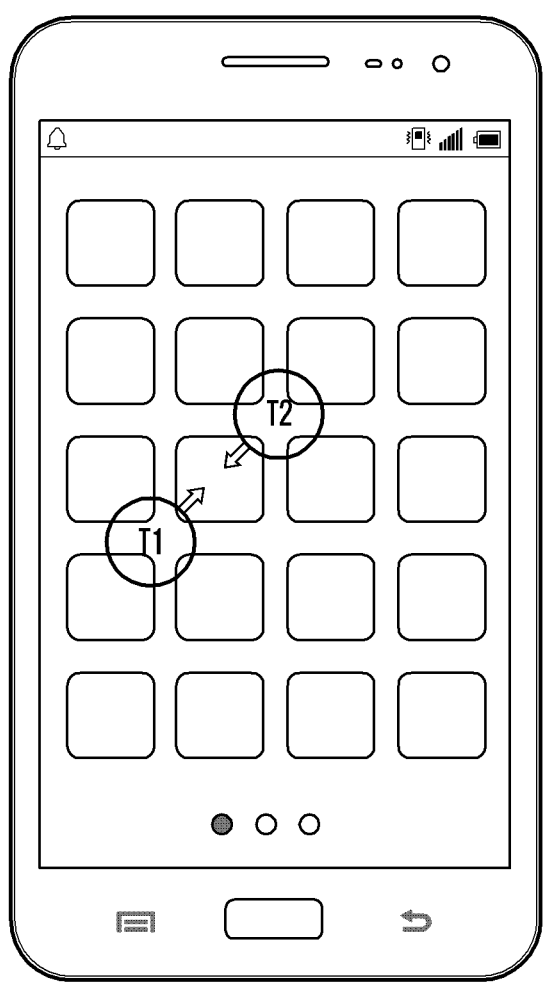
Figure 6C:
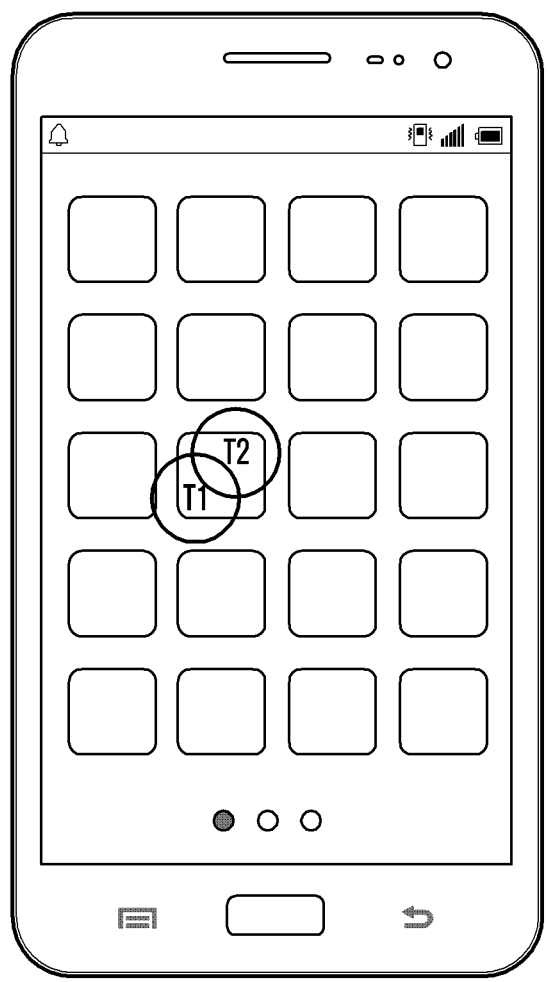
Figure 6D:
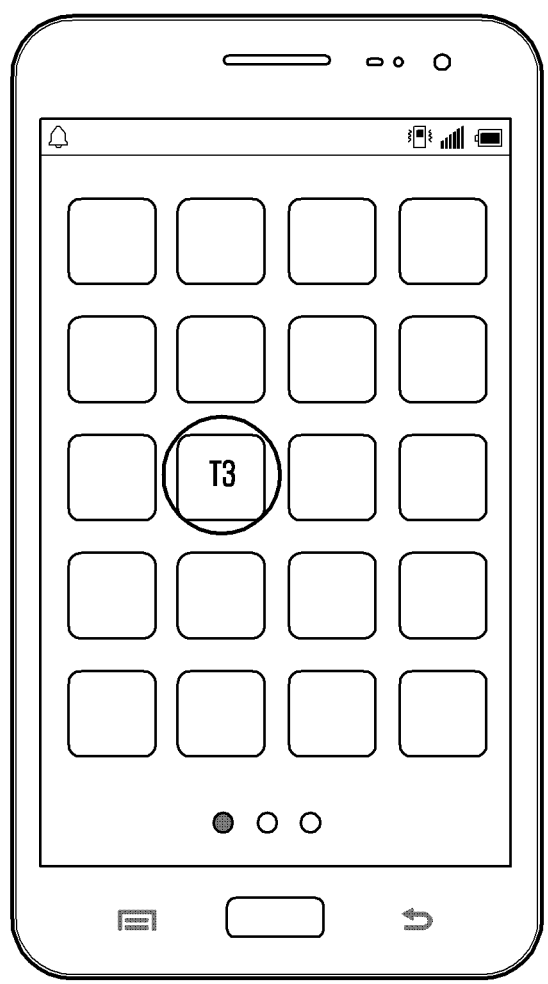
Figure 6E:
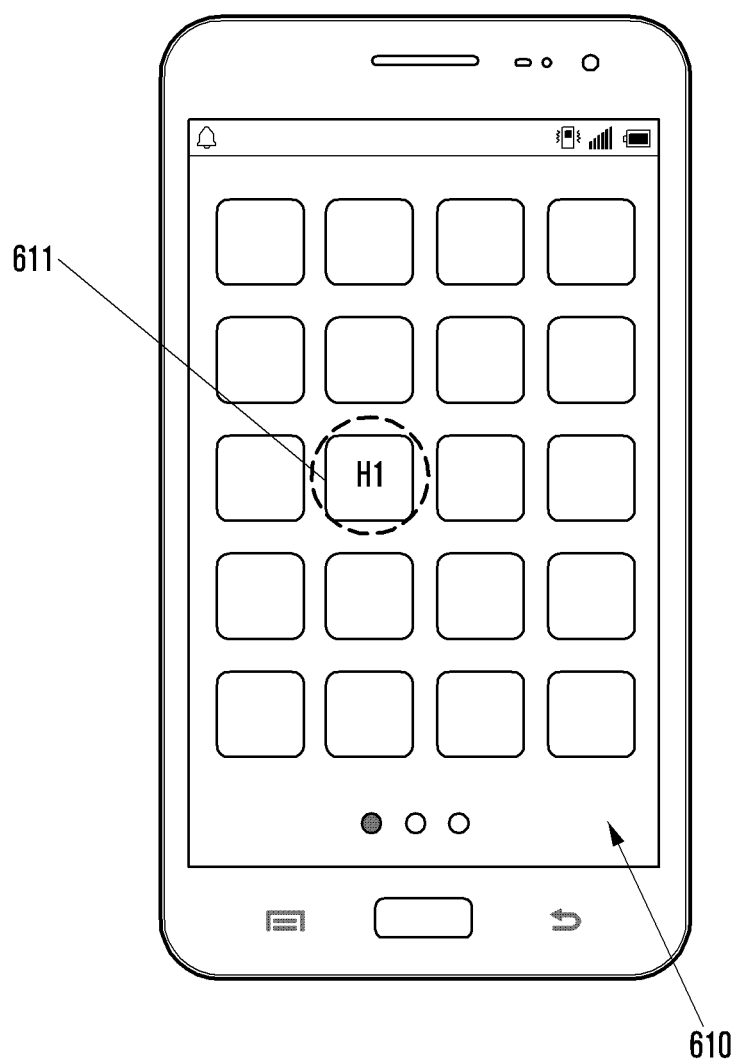
Figure 6F:
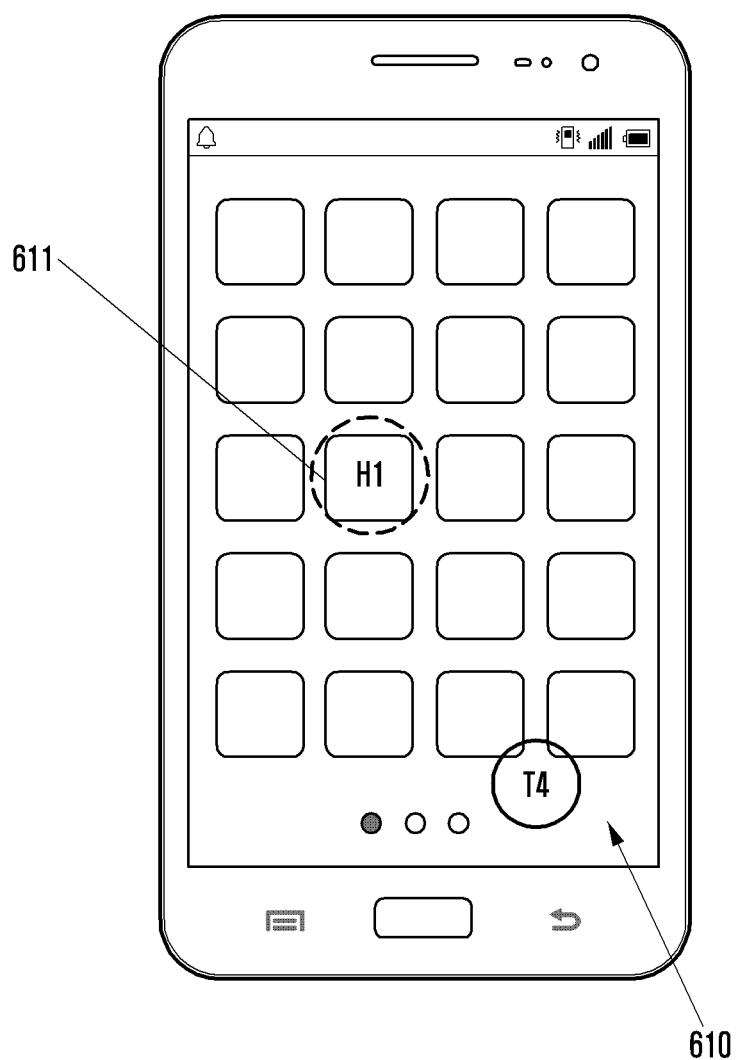
Figure 6G:
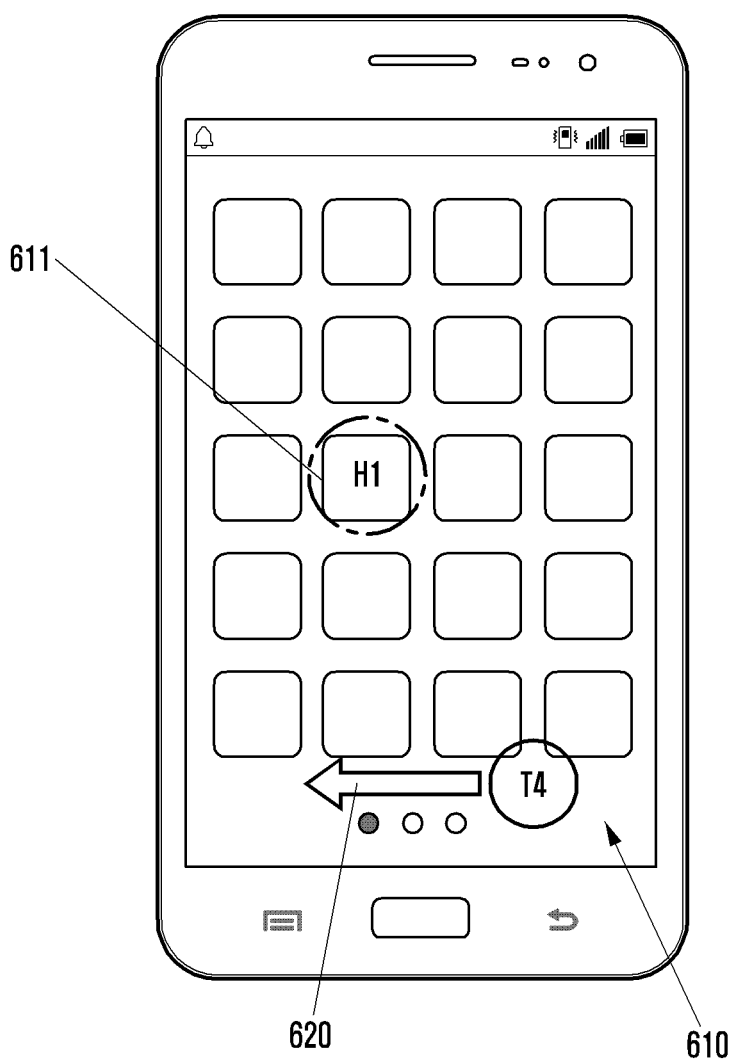
Figure 6H:
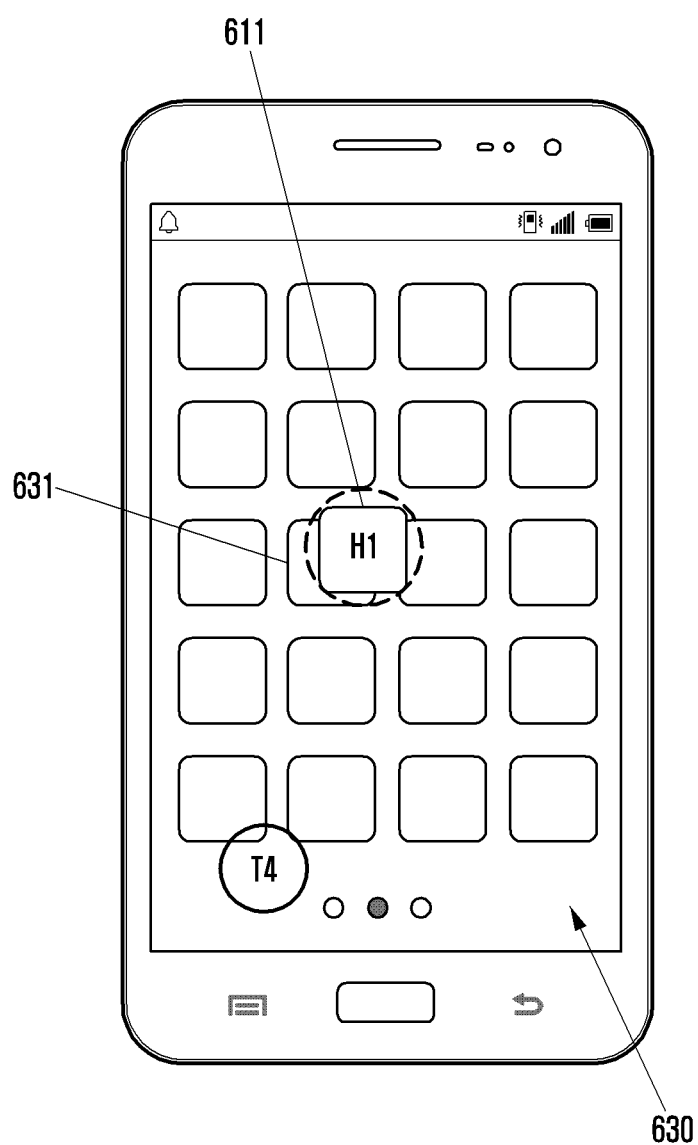
Figure 6I:
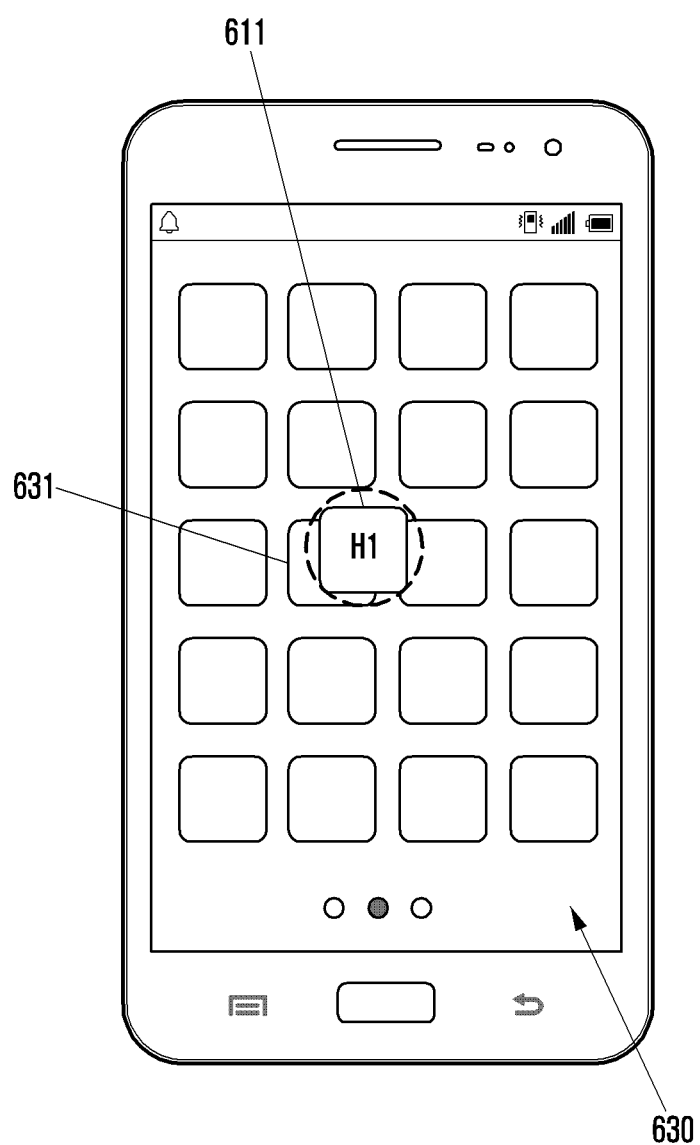
Figure 6J:
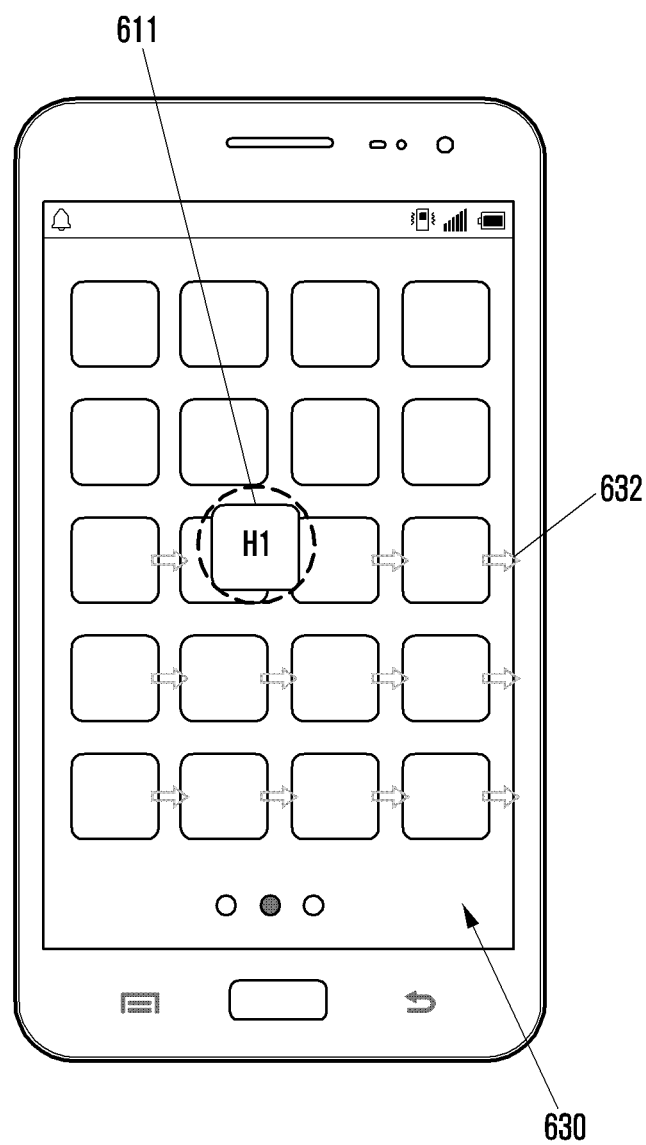
Figure 6K:
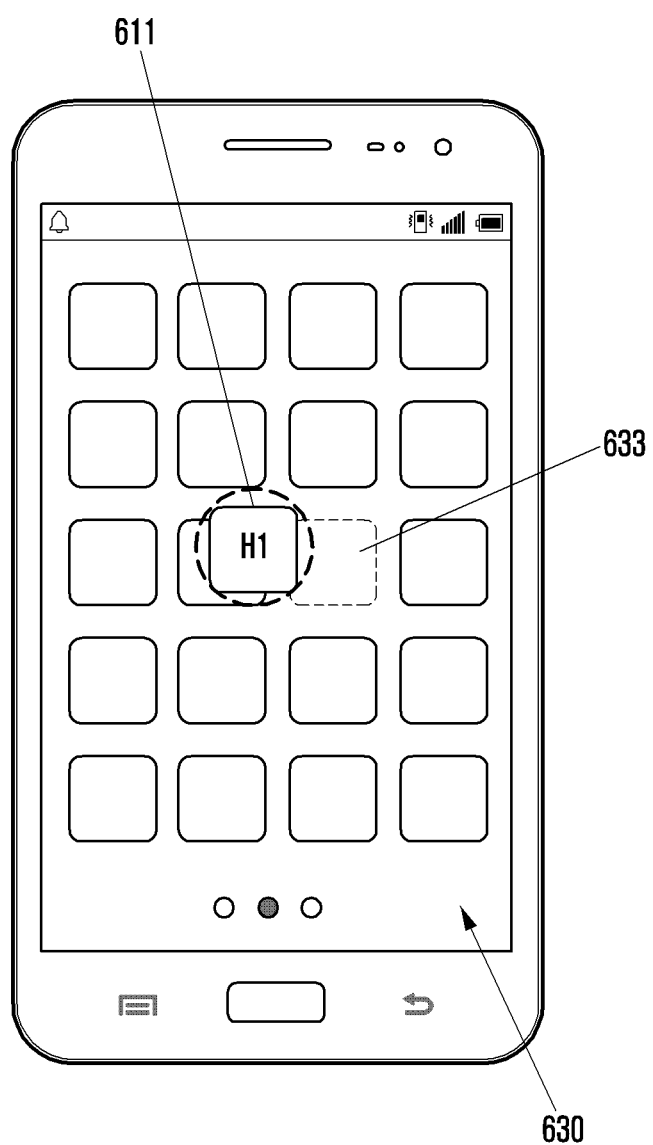
Figure 6L:
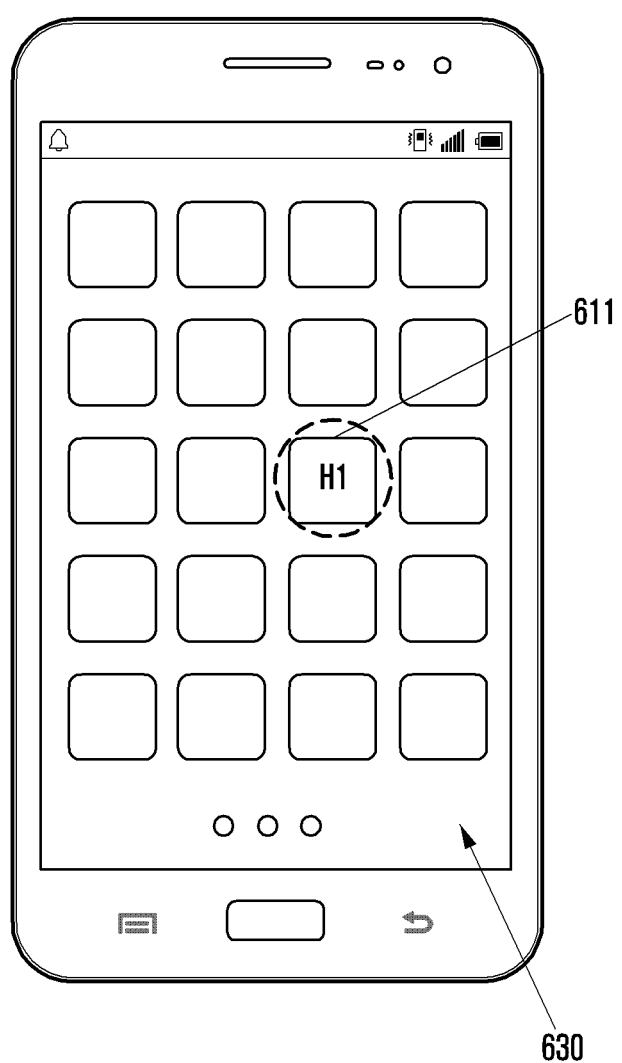
Figure 6M:
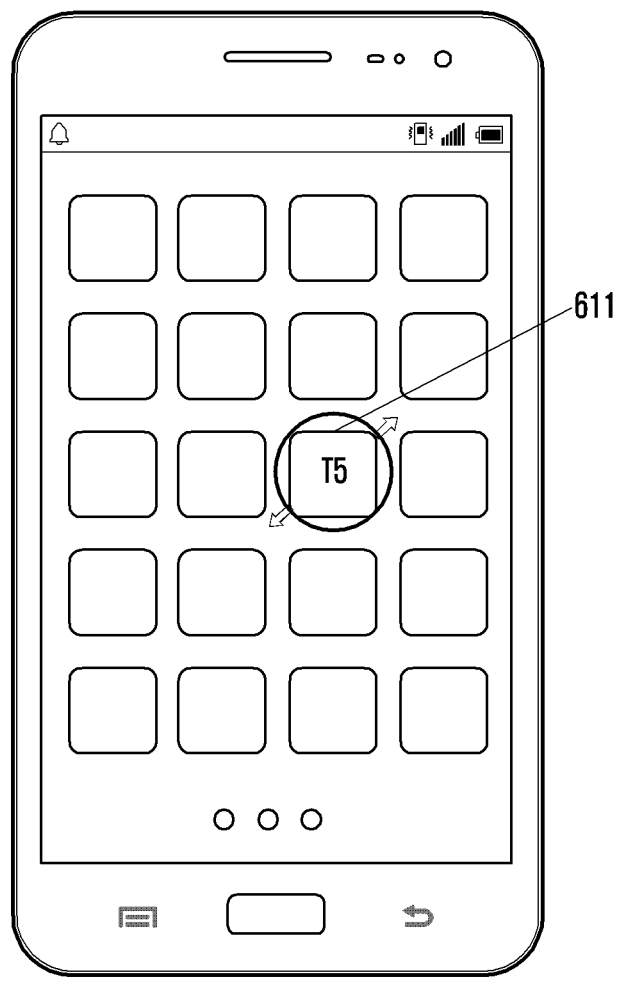
Figure 6N:
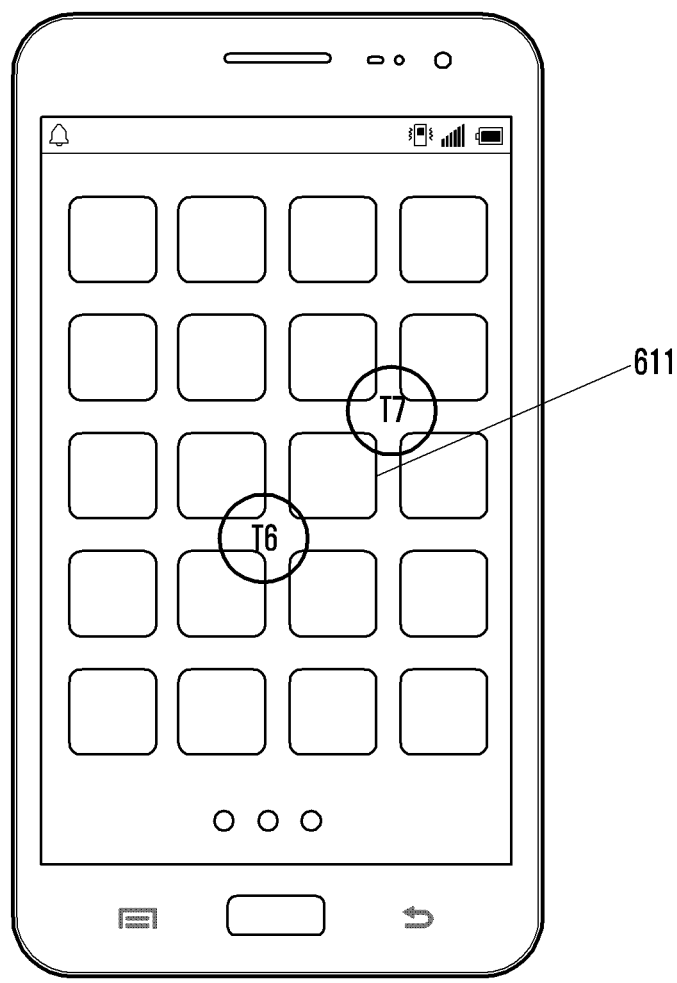

FIGS. 6A-6N are touch screens illustrating a procedure of moving an object in response to the user's gesture according to still another embodiment of the present invention. FIGS. 6A-6D are identical to FIGS. 4A-4D, respectively, and repeated descriptions thereof will be omitted herein. In addition, FIGS. 6M and 6N are also identical to FIGS. 4L and 4M, respectively, and repeated descriptions thereof will be omitted herein.

Referring to FIGS. 6E-6L, the user can hover down H1 with regard to an object 611 of page 610 using physical bodies (e.g. left forefinger and left thumb). While hovering down H1, the user can make a gesture (e.g. drag 620) of touching down T4 a point of the touch screen using another physical body (e.g. right forefinger), moving the right forefinger, and performing touch up at another point of the touch screen. In response to hovering down H1 and dragging 620, the processor 211 can control the display module 260 so as to provide a visual feedback indicating that the object 611 moves from page 610 to page 630. As a result, the object 611 may overlap another object (e.g. object 631) that has been on page 630. In that case, the processor 211 can move 632 the object 631 and other objects. As a result, the area 633 becomes empty, and the processor 211 can move the object 611 to the area 633 in response to the user's gesture (e.g. hovering movement gesture) or automatically.

Figure 7:
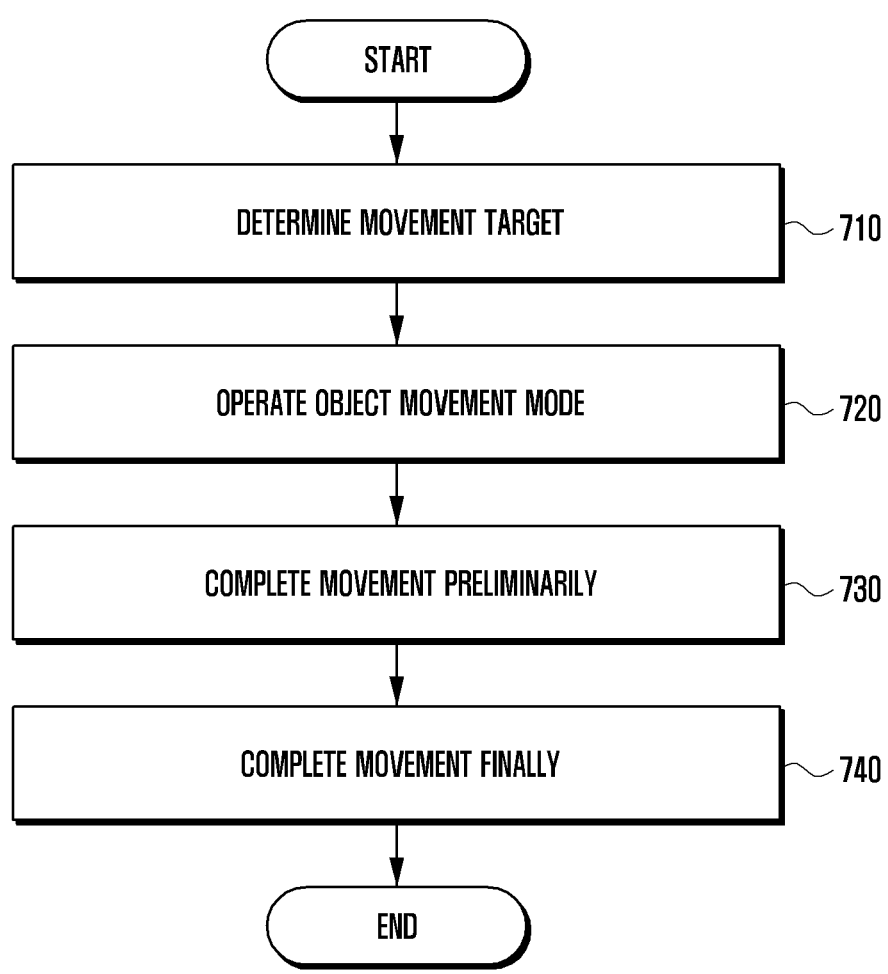
FIG. 7 is a flowchart illustrating an object moving method according to an embodiment of the present invention.

FIG. 7 is a flowchart illustrating an object moving method according to an embodiment of the present invention.

Referring to FIG. 7, in response to a pick up gesture, the electronic device (e.g. electronic device 200) can determine a movement target among objects displayed on the touch screen at step S710. In response to a hovering movement gesture, the electronic device 200 can adopt an object movement mode as the operating mode at step S720. In response to a put down gesture, the electronic device 200 can preliminarily complete the movement of the object at step S730, and the electronic device 200 can finally complete the movement of the object at step S740.

Figure 8:
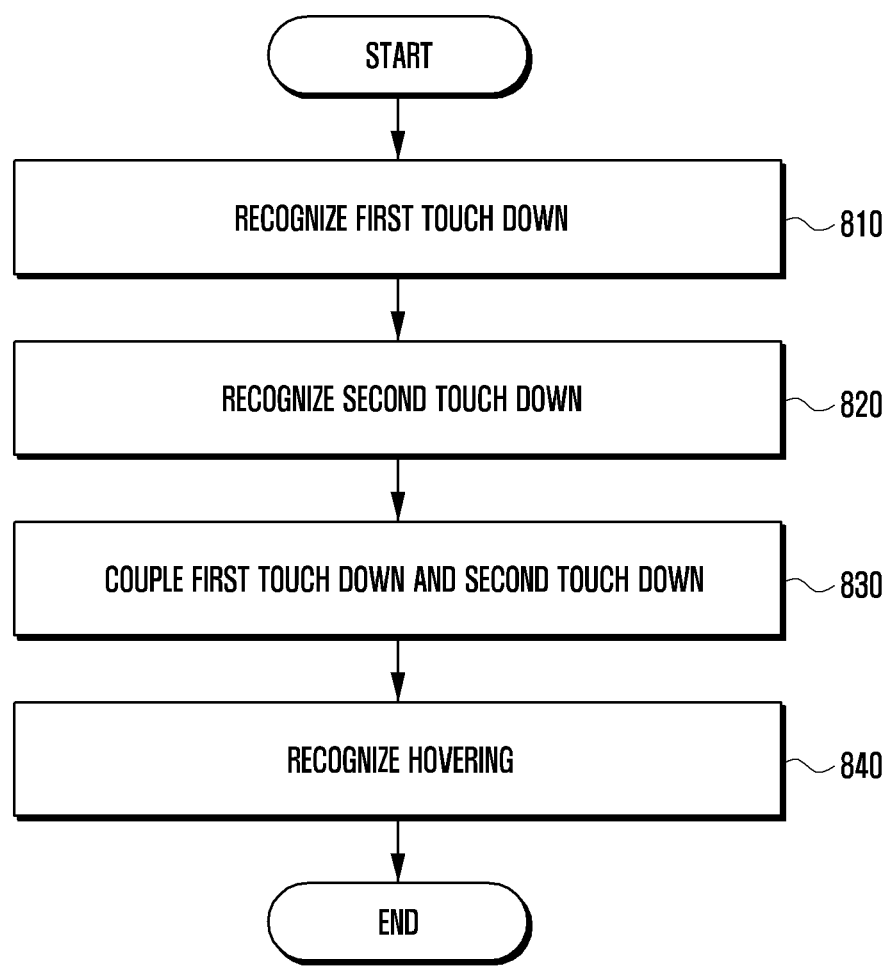
FIG. 8 is a flowchart illustrating a movement target determination step according to an embodiment of the present invention.

FIG. 8 is a flowchart illustrating a movement target determination step according to an embodiment of the present invention.

Referring to FIG. 8, the electronic device 200 can recognize first touch down on the touch screen at step 810. The electronic device 200 can recognize second touch down on the touch screen at step 820. In addition, the electronic device 200 can recognize coupling of the first touch down and the second touch down into one (e.g. touch coupling T3) at step 830. The electronic device 200 can determine at least one object, which is positioned at the touch point (or touch area) of the touch coupling T3, as a movement target. The electronic device 200 can recognize hovering down (e.g. hovering down H1) at step 840. Accordingly, the electronic device 200 can move the object, which has been determined as the movement target, according to the movement of hovering.

Figure 9:
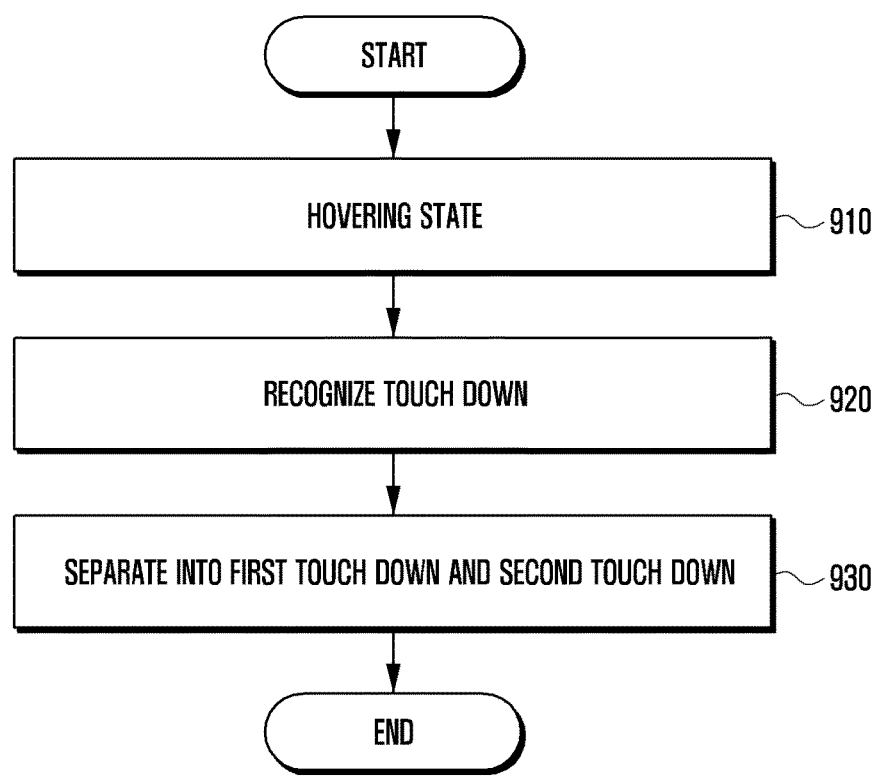
FIG. 9 is a flowchart illustrating a movement preliminary completion step according to an embodiment of the present invention.

FIG. 9 is a flowchart illustrating a movement preliminary completion step according to an embodiment of the present invention.

Referring to FIG. 9, the object, which has been determined as a movement target, may be in a hovering state at step 910. For example, the hovering state may be a state in which the corresponding object is positioned at a specific point on the touch screen. Alternatively, the hovering state may be a state in which the corresponding object is moving. The electronic device 200 can recognize touch down regarding the object, which has been determined as a movement target, at step 920. The electronic device 200 can recognize that the touch down is separated into first touch down and second touch down at step 930. Accordingly, the electronic device 200 can recognize that the movement of the object has been completed preliminarily. The processor 211 can respond to releases of the first touch down and the second touch down and recognize that the movement of the object has been completed finally.

In the present invention, touches can include a touch by contact of a human body, a touch by a physical body having permittivity, and a touch by an electronic pen of an electromagnetic induction type. Objects can include those that can be expressed as images, such as icons, images, texts, files, windows, and widgets. Movement modes can include operating modes in which at least two electronic devices exchange information regarding gestures (e.g. hovering) through near field communication and thereby transmit/receive objects between the electronic devices.

According to various embodiments of the present invention, the first electronic device (e.g. electronic device 100) and the second electronic device (e.g. electronic device 102) can be operated in a multi-window mode. For example, the electronic device 100 can recognize the user's gesture through the user input module 140 and transmit data, which is related to the recognized gesture of the user, to the electronic device 102. Then, the electronic device 102 can respond to the user's gesture, which has been recognized by the electronic device 100, and move the displayed object.

According to various embodiments of the present invention, the user can quickly recognize and familiarly use gestures for movement of objects.

The method according to the present invention as described above may be implemented as a program command which can be executed through various computers and recorded in a computer-readable recording medium. The recording medium may include a program command, a data file, and a data structure. The program command may be specially designed and configured for the present invention or may be used after being known to those skilled in computer software fields. The recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware devices such as a Read-Only Memory (ROM), a Random Access Memory (RAM) and a flash memory. Further, the program command may include a machine language code generated by a compiler and a high-level language code executable by a computer through an interpreter and the like.

The embodiments of the present invention and drawings were provided merely to readily describe and to help a thorough understanding of the present invention but are not intended to limit the scope of the present invention. Therefore, it should be construed that all modifications or modified forms drawn by the technical idea of the present invention in addition to the embodiments disclosed herein are included in the scope of the present invention.

What is claimed is:

1. A method of moving an object by an electronic device having a touch screen, the method comprising:
   recognizing at least two first touch inputs through the touch screen;
   recognizing transitions of the at least two first touch inputs to adjacent inputs that move adjacent to each other;
   determining a target among objects displayed on the touch screen, wherein the target is included at least partially in a touch area corresponding to the adjacent inputs; and
   moving the target in response to movements of the adjacent inputs,
   wherein recognizing transitions of the at least two first touch inputs to adjacent inputs comprises recognizing a pick up gesture,
   wherein moving the target comprises moving an object determined as the target in response to a hovering movement gesture, and
   recognizing a put down gesture.

2. The method of claim 1, further comprising:
   recognizing transitions of the adjacent inputs to at least two second touch inputs;
   recognizing transitions of the at least two second touch inputs to spacing inputs that move away from each other; and
   completing movement of the target in response to the spacing inputs.

3. The method of claim 1, further comprising:
   recognizing transitions of the adjacent inputs to at least two second touch inputs;
   recognizing transitions of the at least two second touch inputs to spacing inputs that move away from each other;
   recognizing transitions of the spacing inputs to release inputs that are released from the touch screen; and
   completing movement of the target in response to the release inputs.

4. The method of claim 1, wherein recognizing a pick up gesture comprises:
   recognizing a gesture by which physical bodies touch down on the touch screen;
   recognizing a touch coupling gesture by which the physical bodies contact each other while touching the touch screen; and
   recognizing a gesture by which the physical bodies contacting each other touch up from the touch screen.

5. The method of claim 4, wherein the target is positioned at a touch point or a touch area corresponding to the touch coupling gesture.

6. The method of claim 1, wherein recognizing a put down gesture comprises:
   recognizing a gesture by which physical bodies touch down on the touch screen;
   recognizing a touch separation gesture by which the physical bodies move away from each other while touching the touch screen; and
   recognizing a gesture by which the physical bodies that have moved away from each other touch up from the touch screen.

7. The method of claim 1, further comprising displaying an object determined as the target to be distinguished from other objects.

8. The method of claim 7, wherein completing movement of the target comprises displaying the target in a state that is the same as the other objects.

9. The method of claim 1, further comprising:
   recognizing hovering down regarding the target;
   recognizing a drag on the touch screen; and
   changing a page, which is to be displayed on the touch screen, and displaying the movement target on the changed page in response to the hovering down and the drag.

10. The method of claim 1, wherein moving the target comprises:
    moving a different object to an empty area created by movement of the target; and
    moving the target to the empty area created by movement of the different object.

11. A method of moving an object by an electronic device having a touch screen, the method comprising:
    recognizing at least two first touch inputs through the touch screen;
    determining at least one target among objects displayed on the touch screen;
    recognizing transitions of the at least two first touch inputs to adjacent inputs that move adjacent to each other; and
    moving the at least one target in response to movements of the adjacent inputs,
    wherein recognizing transitions of the at least two first touch inputs to adjacent inputs comprises recognizing a pick up gesture, by which physical bodies touch down on the touch screen, move adjacent to each other, and touch up, and
    wherein the at least one target is determined based on touch points corresponding to touch downs, respectively.

12. The method of claim 11, further comprising gathering objects, which have been determined as the at least one target, at a location and displaying the objects in response to the pick up gesture.

13. The method of claim 12, wherein completing movement of the at least one target comprises distributing the objects, which have been gathered at a location, and displaying the objects in response to a put down gesture by which the physical bodies touch down on the touch screen, move away from each other, and touch up, and completing movement of the at least one target in response to the put down gesture.

14. An electronic device comprising:
   a display module;
   a touch panel installed on a touch screen of the display module and configured to sense a user input; and
   a processor configured to control the display module in response to the user input,
   wherein the processor is configured to recognize at least two first touch inputs through the touch screen, recognize transitions of the at least two first touch inputs to adjacent inputs moving adjacent to each other, determine a target among objects displayed on the touch screen, and move the target in response to movements of the adjacent inputs,
   wherein the target is included at least partially in a touch area corresponding to the adjacent inputs, and
   wherein the processor is configured to:
      move the target in response to a hovering movement gesture after recognizing a pick up gesture, and
      complete movement of the target in response to a put down gesture.

15. The electronic device of claim 14, further comprising a communication module, and the processor is configured to control the communication module so as to transmit data related to the first touch inputs, the adjacent inputs, and movements of the adjacent inputs to an external device.

* * * * *